(12) United States Patent
Manwiller

(10) Patent No.: US 11,645,377 B1
(45) Date of Patent: May 9, 2023

(54) ONLINE AUTHENTICATION AND SECURITY MANAGEMENT USING DEVICE-BASED IDENTIFICATION

(71) Applicant: WALGREEN CO., Deerfield, IL (US)

(72) Inventor: Peter Manwiller, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 159 days.

(21) Appl. No.: 17/035,960

(22) Filed: Sep. 29, 2020

Related U.S. Application Data

(62) Division of application No. 15/679,776, filed on Aug. 17, 2017, now Pat. No. 10,860,703.

(51) Int. Cl.
  *G06F 21/34* (2013.01)
  *H04L 9/40* (2022.01)
  *G06F 21/31* (2013.01)

(52) U.S. Cl.
  CPC ........... *G06F 21/34* (2013.01); *G06F 21/316* (2013.01); *H04L 63/0876* (2013.01); *H04L 63/10* (2013.01); *H04L 63/126* (2013.01); *H04L 63/1408* (2013.01); *H04L 63/1441* (2013.01)

(58) Field of Classification Search
  CPC ... H04L 63/0876; H04L 63/10; H04L 63/126; H04L 29/06836; H04L 29/0685; G06F 21/31; G06F 21/316
  See application file for complete search history.

(56) References Cited

U.S. PATENT DOCUMENTS

| | | | | |
|---|---|---|---|---|
| 5,684,945 | A * | 11/1997 | Chen | G06F 11/323 714/E11.181 |
| 6,006,260 | A * | 12/1999 | Barrick, Jr | H04L 41/5009 709/227 |
| 6,449,739 | B1 * | 9/2002 | Landan | G06F 11/3414 714/E11.193 |
| 6,922,776 | B2 * | 7/2005 | Cook | H04L 63/0823 713/157 |
| 7,100,049 | B2 * | 8/2006 | Gasparini | H04L 63/08 713/176 |
| 7,178,025 | B2 * | 2/2007 | Scheidt | H04L 63/062 713/168 |
| 7,346,775 | B2 * | 3/2008 | Gasparini | H04L 67/02 726/19 |
| 7,526,485 | B2 * | 4/2009 | Hagan | H04L 63/0823 |
| 7,739,512 | B2 * | 6/2010 | Hawkes | H04L 63/168 726/28 |

(Continued)

OTHER PUBLICATIONS

Search Query Report from IP.com (performed Jun. 3, 2022) (Year: 2022).*

(Continued)

*Primary Examiner* — Sharon S Lynch
(74) *Attorney, Agent, or Firm* — Marshall, Gerstein & Borun LLP; Randall G. Rueth

(57) ABSTRACT

Techniques are disclosed to provide enhanced online security. A network server actively monitors data between a network server hosting a website and a computing device. Some of the disclosed techniques leverage "cookie stitchers" to associate user data, which may include a website identifier, to the user's computing devices. These techniques allow the network server to block access to explicitly identified computing devices, or to trigger two-factor authentication.

13 Claims, 8 Drawing Sheets

(56) References Cited

U.S. PATENT DOCUMENTS

| | | | | |
|---|---|---|---|---|
| 8,321,913 | B2* | 11/2012 | Turnbull | H04W 12/06 726/4 |
| 8,356,333 | B2* | 1/2013 | Kramer | H04L 63/1483 726/4 |
| 8,615,809 | B2* | 12/2013 | Bajaj | H04L 63/168 713/161 |
| 8,640,216 | B2* | 1/2014 | Anderson | H04L 63/08 713/161 |
| 8,856,869 | B1* | 10/2014 | Brinskelle | H04L 63/0823 726/2 |
| 8,893,255 | B1* | 11/2014 | Martini | H04L 67/564 709/238 |
| 8,898,450 | B2* | 11/2014 | Harjanto | H04L 63/08 726/4 |
| 9,319,419 | B2* | 4/2016 | Sprague | H04L 63/0861 |
| 9,781,097 | B2* | 10/2017 | Grajek | H04L 67/10 |
| 10,171,439 | B2* | 1/2019 | Camenisch | H04L 63/0876 |
| 10,419,418 | B2* | 9/2019 | Grajek | H04L 63/0807 |
| 2001/0044820 | A1* | 11/2001 | Scott | H04L 63/0428 709/202 |
| 2001/0054155 | A1* | 12/2001 | Hagan | H04L 67/306 707/999.009 |
| 2004/0030784 | A1* | 2/2004 | Abdulhayoglu | H04L 63/123 709/227 |
| 2004/0039846 | A1* | 2/2004 | Goss | H04M 7/003 709/248 |
| 2004/0215959 | A1* | 10/2004 | Cook | H04L 63/0823 726/22 |
| 2004/0243802 | A1* | 12/2004 | Jorba | G06F 21/10 713/168 |
| 2004/0250075 | A1* | 12/2004 | Anthe, II | H04L 63/0823 713/175 |
| 2005/0044213 | A1* | 2/2005 | Kobayashi | H04L 43/10 709/224 |
| 2005/0166053 | A1* | 7/2005 | Cui | H04L 63/126 713/176 |
| 2005/0177750 | A1* | 8/2005 | Gasparini | G06F 21/31 726/5 |
| 2005/0235148 | A1* | 10/2005 | Scheidt | G06Q 20/3829 713/168 |
| 2006/0004772 | A1* | 1/2006 | Hagan | G06Q 20/4014 |
| 2006/0282660 | A1* | 12/2006 | Varghese | G07F 7/1083 713/155 |
| 2006/0288213 | A1* | 12/2006 | Gasparini | H04L 67/02 713/170 |
| 2007/0203850 | A1* | 8/2007 | Singh | G07F 19/207 705/67 |
| 2007/0244904 | A1* | 10/2007 | Durski | G06F 8/30 |
| 2008/0028444 | A1* | 1/2008 | Loesch | G06F 16/9574 726/4 |
| 2008/0028475 | A1* | 1/2008 | Kalman | G06F 21/445 726/28 |
| 2008/0072053 | A1* | 3/2008 | Halim | H04L 63/0815 713/176 |
| 2008/0091618 | A1* | 4/2008 | Obrea | G06F 21/31 705/76 |
| 2008/0120711 | A1* | 5/2008 | Dispensa | H04L 63/08 726/5 |
| 2008/0196084 | A1* | 8/2008 | Hawkes | H04L 63/1441 707/E17.119 |
| 2008/0229109 | A1* | 9/2008 | Gantman | H04L 9/0869 713/176 |
| 2010/0031022 | A1* | 2/2010 | Kramer | H04L 63/1483 726/3 |
| 2010/0325040 | A1* | 12/2010 | Etchegoyen | G06F 21/73 705/39 |
| 2011/0154473 | A1* | 6/2011 | Anderson | H04L 63/1483 726/11 |
| 2011/0179477 | A1* | 7/2011 | Starnes | H04L 63/12 726/9 |
| 2012/0159177 | A1* | 6/2012 | Bajaj | H04L 63/168 713/176 |
| 2012/0210119 | A1* | 8/2012 | Baxter | G06Q 30/0253 713/150 |
| 2012/0215896 | A1* | 8/2012 | Johannsen | H04L 67/303 709/223 |
| 2012/0233665 | A1* | 9/2012 | Ranganathan | G06F 21/51 726/4 |
| 2012/0317622 | A1* | 12/2012 | Harjanto | G06F 21/44 726/4 |
| 2013/0212654 | A1* | 8/2013 | Dorfman | H04L 67/02 726/5 |
| 2015/0089568 | A1* | 3/2015 | Sprague | H04L 63/107 726/1 |
| 2016/0105424 | A1* | 4/2016 | Logue | H04L 12/2809 726/7 |
| 2016/0234729 | A1* | 8/2016 | Achtari | H04L 63/164 |
| 2017/0093821 | A1* | 3/2017 | Camenisch | H04L 63/0876 |
| 2017/0180347 | A1* | 6/2017 | Koved | H04L 63/083 |
| 2018/0124039 | A1* | 5/2018 | Grajek | G06F 21/64 |
| 2018/0255057 | A1* | 9/2018 | Hein | H04L 67/125 |

OTHER PUBLICATIONS

Search Query Report from IP.com (performed Dec. 5, 2022) (Year: 2022).*

* cited by examiner

ONLINE AUTHENTICATION AND SECURITY MANAGEMENT USING DEVICE-BASED IDENTIFICATION

CROSS-REFERENCE TO RELATED APPLICATIONS

The present disclosure is a divisional application claiming priority to U.S. patent application Ser. No. 15/679,776 filed on Aug. 17, 2017, entitled "Online Authentication and Security Management Using Device Based Identification" the disclosure of which is hereby incorporated herein by reference in its entirety.

TECHNICAL FIELD

The present disclosure relates generally to enhanced online security measures and, more particularly, to triggering two-factor authentication unless a computing device and/or a user is properly identified.

BACKGROUND

Traditionally, websites may allow users to access sensitive, or secure hosted content upon verifying user authenticating information, such as a username and password that are provided by the user as part of a sign-in procedure. In some instances, a website may utilize enhanced security measures by requiring a user to successfully complete a two-factor authentication (2FA) procedure in addition to providing the appropriate authenticating information. In such a scenario, 2FA is typically triggered based upon user preferences or settings, or when a user attempts to change the authenticating information. However, conventional websites fail to trigger 2FA in a manner that adequately addresses common security threats.

For instance, conventional websites may only identify and grant users access to secure content by verifying the entered authenticating information. Although the authenticating information may be associated with a single user, other users may acquire this information when it is intentionally shared among several users, or via other nefarious means. In any event, conventional systems typically do not trigger 2FA as long as the authenticating information is verified, regardless of the user and/or device from which this information is received. And because conventional systems have no way of accurately identifying whether a current user is associated with a particular computing device, other users may access the secure content from other computing devices using the same user authenticating information. As a result, conventional systems have several drawbacks and fail to employ satisfactory security measures to prevent unauthorized or unwanted access to secure content.

SUMMARY

Various embodiments are described herein that provide enhanced security by controlling access to secure content on a per-device and/or per-user basis. In some embodiments, third party "cookie stitchers" are implemented to provide cross-device user identification, which may be used by a network server to control access to hosted secure content. Cookie-stitching embodiments include a cookie-stitching server accessing user records (i.e., user data) to identify several computing device that are correlated to a particular user, who may be identified via a unique website identifier (i.e., "attribute" or "website ID") included in the user record.

In accordance with cookie-stitching embodiments, the network server may receive user authenticating information via a computing device, and the network server may generate a separate website identifier using this user authentication information. Cookie-stitching embodiments include the network server determining whether the network-server generated website ID matches the website ID contained in the user data retrieved from the cookie-stitcher. These two website IDs should match unless a computing device is attempting to access secure content that is associated with a different user than the one identified by the network server in accordance with the received user authenticating information. In that case, the network server may trigger 2FA, and grant the computing device access to the secure content upon satisfaction of one or more conditions associated with the 2FA. In the event that the website identifiers do match, then the network server may grant the computing device access to the secure content without triggering 2FA.

In other, non-cookie-stitching embodiments, the network server may track each computing device that accesses secure content and "tag" each computing device that does so with a data token that is stored on the computing device. This data token may be based upon a hashed value of one or more device metrics that are associated with various physical and/or operational aspects of each computing device and/or a random number, and thus represents a unique computing device identifier (UCDI). In non-cookie-stitching embodiments, the network server may maintain a log of each computing device that previously accessed the secure content, the one or more device metrics, and the data token, as part of device management data (DMD). As each new (i.e., not stored in the DMD), computing device visits the website, each computing device is tagged with a data token and the DMD is updated with the data token information and/or one or more device metrics, when applicable.

The non-cookie-stitching embodiments also allow a user to access her DMD by providing user authenticating information, and to identify each computing device as being authorized or unauthorized to access the secure content. If all computing devices within a user's DMD are authorized, then the network server may handle requests for access to secure content (e.g., receipt of authenticating information) in accordance with a first security protocol that includes a first set of security verifications. This first set of security verifications generally determine whether certain information included in the DMD matches data included in the data token stored on the computing device, indicating that the computing device has previously accessed the secure content, and triggering 2FA if not.

The non-cookie-stitching embodiments also include handling access to secure content in accordance with a second security protocol that includes a second set of security verifications when any of the computing devices within a user's DMD are unauthorized to access the secure content. In this scenario, the network server may block access to the secure content for such identified computing devices, regardless of whether the user authenticating information is correct or whether a triggered 2FA is successful. Furthermore, the second set of security verifications may be similar to the first set of security verifications as discussed above, but trigger an additional use of 2FA when data tokens are not present, when the UCDI is not included as part of the DMD, and/or when certain information included in the DMD does not match data stored on the computing device.

BRIEF DESCRIPTION OF THE DRAWINGS

The Figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1A:
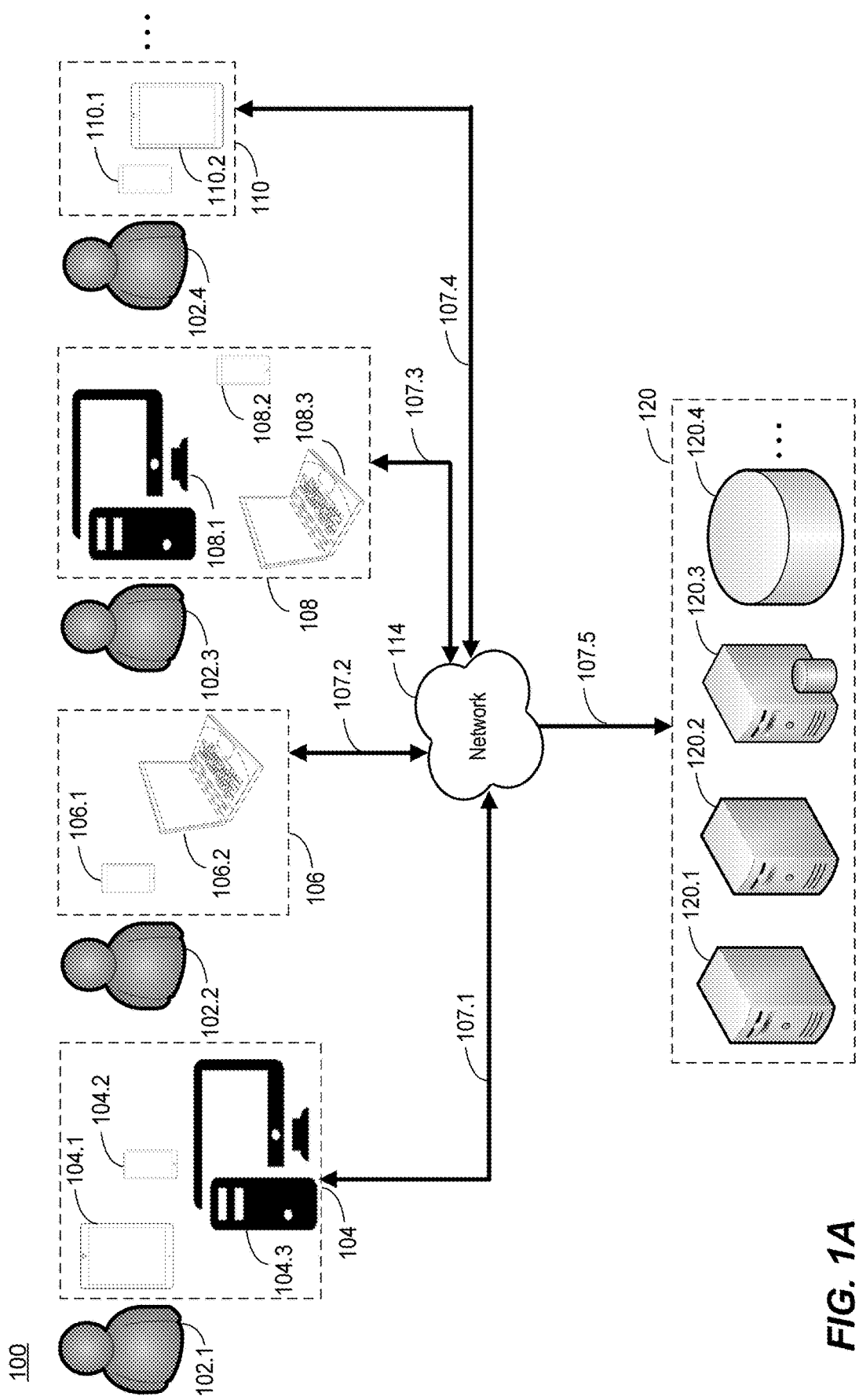
FIG. 1A is a block diagram of an example online security system 100, in accordance with embodiments of the present disclosure.

FIG. 1A is a block diagram of an example online security system 100 ("system 100"), in accordance with embodiments of the present disclosure. In an embodiment, system 100 may include any suitable number N of users 102.1-102.N, four being shown in FIG. 1 (users 102.1-102.4), and each of these users 102.1-102.4 being associated with a set of computing devices 104, 106, 108, and 110, respectively. System 100 may also include a communication network 114 and one or more back-end components 120. System 100 may include additional, fewer, or alternate components, including those discussed elsewhere herein.

For the sake of brevity, system 100 is illustrated as including only 4 users 102.1-102.4. Furthermore, system 100 is illustrated as including a single communication network 114, a set of four back-end components 120, etc. However, the embodiments described herein may include any suitable number of the components illustrated in FIG. 1A and/or elsewhere as discussed herein. For example, the system 100 may support several hundred users 102, each being associated with any suitable number of computing devices. Moreover, the back-end components 120 may communicate with one or more of the computing devices 104, 106, 108, and/or 110, via communication network 114 to receive requests for access to hosted secure content, websites, website accounts (which may also contain secure content), applications, etc., provided by and/or otherwise supported by the back-end components 120, as further discussed herein.

Communication network 114 may be configured to facilitate communications between one or more of each user's computing devices 104, 106, 108, and/or 110, and/or one or more back-end components 120, using any suitable number of wired and/or wireless links. Communication network 114 may support communications between these various components in accordance with any suitable number and/or type of communication protocols, which may be the same or different communication protocols based upon the particular components for which communication is being supported. These wired and/or wireless links may be represented in FIG. 1A as links 107.1-107.5, for example, for ease of explanation, although it will be understood that each computing device (e.g., computing device 104.1-104.3, 106.1-106.2, 108.1108.3, and/or 110.1-110.2, etc., which may alternatively be referred to herein simply as "computing devices") may individually communicate with one or more backend components 120 via communication network 114. To support such communications, communication network 114 may include any suitable number of nodes, additional wired and/or wireless networks, etc., in various embodiments.

For example, in an embodiment, communication network 114 may be implemented as a local area network (LAN), a metropolitan area network (MAN), a wide area network (WAN), or any suitable combination of local and/or external network connections. To provide further examples, communication network 114 may include wired telephone and cable hardware, satellite, cellular phone communication networks, femtocells, access points, macrocells, etc. In an embodiment, communication network 114 may provide one or more computing devices and/or one or more back-end components 120 with connectivity to network services, such as Internet services, for example, and/or support application programming interface (API) calls between one or more computing devices and/or one or more back-end components 120.

To this end, one or more computing devices and/or one or more back-end components 120 may be configured to communicate with one another via communication network 114 using any suitable number and/or type of communication protocols, such as Wi-Fi, cellular, BLUETOOTH, NFC, RFID, Internet communications, etc., or any combination thereof. For example, computing device 104.2 may be configured to communicate with the Internet and/or one or more backend components 120 via communication network 114 using cellular communications to send data to and/or receive data from one or more back-end components 120 using links 107.1 and 107.5. To provide another example, computing device 108.1 may be configured to communicate with one or more back-end components 120 via a wired Internet protocol using links 107.3 and 107.5.

In various embodiments, the computing devices may be implemented as any suitable type of computing and/or client device, such as a smartphone, a personal digital assistant (PDA), a tablet computer, a laptop computer, a desktop computer, a thin client laptop, a wearable electronic device, etc. As further discussed below, one or more of the users 102.1-102.4 may use any one of their respective computing devices to access the Internet and navigate to various websites and request access to secure content, one or more of which may be associated with a particular retailer or other suitable entity that is hosted by one or more of back-end computing devices 120. For example, a user may browse a retailer's website to perform various activities based upon the nature of the retailer. For instance, a user may navigate the retailer's website to
browse and purchase items, to access user account information and/or view other secure content, to request prescription refills, to view the status of prescription refills, to provide a preferred pickup location for purchased products (including prescription refills), etc.

Additionally or alternatively, a user may browse a retailer's website to register with the retailer and/or to create a user profile for a particular retailer, which may result in a unique website identifier ("website ID," or "attribute") being generated and associated with that particular user. The website ID may allow one or more of the back-end computing devices 120 to recognize a user when navigating a retailer's website and to match a user with his or her user profile data as well as other information associated with the user, such as the user's DMD, for example, in applicable embodiments. This website ID may include, for example, any suitable type of unique identifier such as a numeric code. To provide an illustrative example, upon browsing the retailer's website, a user may be prompted to enter authenticating information (e.g., login information) and/or to complete an initial registration process to create a user profile, whereby the user provides information such as contact information, demographic information, payment information, etc. Additionally or alternatively, the user may initially create a user profile over the phone, via the postal service, via a specialized retailer application installed on the particular computing device (e.g., an application installed on a mobile computing device), etc.

Once created, the website ID may also allow a retailer's website to link a user to various types of information, which may include secure content of a sensitive nature during a particular web-browsing session, as well as generic content that may be of an insensitive nature. Secure content may include, for example, payment information, insurance information, health records, prescription information, and/or other health-related information that may be protected by the Health Insurance Portability and Accountability Act of 1996 (HIPPA), etc. On the other hand, generic content may include, for example, the user's name, contact information, demographic information, etc. Of course, the retailer's website may provide users with access to other types of content that is available to all users, regardless of whether the user has a website ID, such as information that is typically associated with any user browsing the website including store locations and hours, current promotions, etc.

To support the various website functionalities as discussed herein, the back-end components 120 may include one or more external components such as a cookie-stitching server 120.1, a network server 120.2, a database server 120.3, and/or a database 120.4. Again, although FIG. 1A illustrates one or more back-end components 120 as including only four different types of back-end components, embodiments include one or more back-end components 120 implementing any suitable number and/or type of back-end components to facilitate the appropriate functions of the embodiments as described herein. The one or more back-end components 120 may be configured to receive data from and/or send data to one or more computing devices via communication network 114 using any suitable number of wired and/or wireless links. In various embodiments, one or more back-end components 120 may be configured to execute one or more applications, to support one or more applications executed on the computing devices, to host, provide, and/or support content for one or more websites, and/or to perform one or more functions associated with the embodiments as discussed herein.

In various embodiments, database server 120.3 may be implemented as any suitable number and/or type of servers that are configured to access data from database 120.4, which may store any suitable type of data as further discussed below. In various embodiments, one or more of back-end components 120 may communicate with database 120.4 (by communicating with database server 120.3 or via communication with database 120.4) to store data to and/or to read data from database 120.4 as needed to facilitate the appropriate functions of the embodiments as described herein. Database 120.4 may be configured to store any suitable relevant data as described in the embodiments presented herein related to the operation of system 100. Such data may include, for example, secure content or other user information, payment information, contact information, demographic information, contact information, website IDs, DMD (e.g., such as that shown in DMD 150 in FIG. 1B), etc. Additionally or alternatively, database 120.4 may be configured to store the user record data received from cookie-stitching server 120.1 and/or data used to update the user record data when appropriate.

Furthermore, one or more back-end components 120 may store and/or access secure content that is of a private, proprietary, and/or sensitive nature. As a result, various embodiments of one or more back end components 120, communication network 114, and/or the computing devices implementing appropriate security protocols such as encryption, secure links, network authentication, firewalls, etc., to appropriately protect such secure content.

Figure 1B:
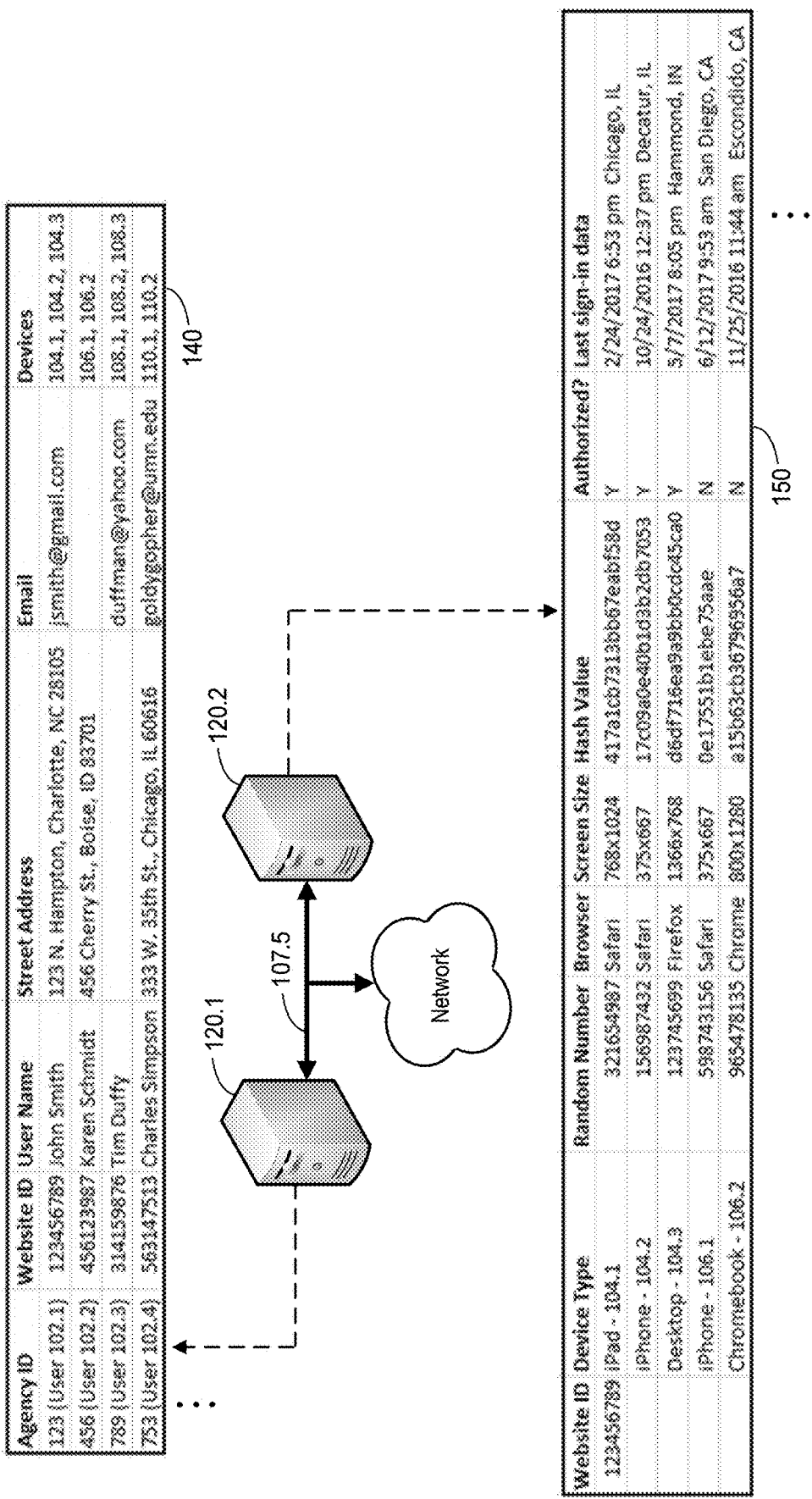
FIG. 1B shows an example of part of online security system 100 in further detail, illustrating user record data 140 and device management data (DMD) 150, in accordance with embodiments of the present disclosure.

In various embodiments, cookie-stitching server 120.1 may be implemented as any suitable number of servers configured to facilitate Internet communications, to communicate with the other back-end components 120 and/or computing devices (e.g., computing devices 104, 106, 108, and 110), and to facilitate the cross-device identification of individual users. In various embodiments, the cookie-stitching server 120.1 may be configured to store or otherwise access a user record for several users to identify each user in terms of a unique "Agency ID," which is illustrated in FIG. 1B in further detail as user record data 140. Although the user record data 140 shown in FIG. 1B only includes information for each of the users 102.1-102.4 for purposes of brevity, embodiments include the user record data 140 including a user record for several hundred, several thousand, several million, etc., of different users, each having a unique agency ID. Furthermore, the user record data 140 may include additional, fewer, or alternate information than that shown in FIG. 1B.

For example, the cookie-stitching server 120.1 may be implemented as one or more servers, computing devices, etc., which harvests data from one or more computing devices over time using several data sources to build a user record for each user. In an embodiment, the cookie-stitching server 120.1 may be implemented as a third-party server configured to provide cross-device user identification in accordance with marketing or advertising purposes, and is separate from the retailer's network server 120.2, which may function as a web server to provide hosted content in accordance with the various embodiments as discussed herein. For example, the cookie-stitching server 120.1 may purchase data provided by various suppliers, analyze web traffic, and/or communicate with other computing devices to collect cookie data, browsing data, unique device identifier data, contact information, demographic information, etc., associated with one or more users. By analyzing this pool of data over time, the cookie-stitching server 120.1 may correlate each user with their respective computing devices and/or other information to build user records, as illustrated by the user record data 140 in FIG. 1B.

Embodiments include the cookie-stitching server 120.1 being configured to communicate with the network server 120.2 and/or other back-end components 120 in various ways to support the functionality of the embodiments as described herein. For example, the cookie-stitching server 120.1 may periodically communicate with the network server 120.2, database server 120.3, and/or database 102.4 to update each user record as additional data becomes available (e.g., when a new website ID is generated for a particular user, when new or updated demographic information becomes available, etc.).

Additionally or alternatively, the cookie-stitching server 120.1 may be configured to communicate with other computing devices, servers, databases, etc., that are not shown in FIG. 1A for purposes of brevity. In any event, embodiments include the cookie-stitching server 120.1 identifying a user as she visits a website by identifying one or more different types of information that is received from the user's computing device, such as unique information identifying the user's currently-used computing device, cookie data, browsing data, etc., and then referencing a user record that contains that particular information, as the case may be. In this way, the cookie-stitching server 120.1 may identify unique users and provide user records to the network server 120.2 regardless of which computing device is used to visit the retailer's website.

In non-cookie-stitching embodiments, as further discussed herein, the network server 120.2 may be configured to provide enhanced online security measures by maintaining, accessing, and/or updating a DMD, and determining whether computing devices accessing the retailer's website include matching information contained in the DMD. An example DMD 150 is shown in FIG. 1B, the details of which are further discussed below in accordance with the non-cookie-stitching embodiments. In accordance with non-cookie-stitching embodiments, the cookie-stitching server 120.1, and the functionality it provides via communication with the network server 120.2, is not necessary. Thus, the cookie-stitching server 120.1 may be omitted in non-cookie-stitching embodiments.

In various embodiments (i.e., in both cookie-stitching embodiments and non-cookie-stitching embodiments), the network server 120.2 may be configured as any suitable number and/or type of computing devices configured to support one or more websites (e.g., retailer websites), which may include managing, storing data, providing, arbitrating, or otherwise controlling access to various types of hosted content, etc. For example, the network server 120.2 may be configured to facilitate website hosting to provide hosted content to various computing devices in accordance with the embodiments described herein. Therefore, embodiments include network server 120.2 being implemented as one or more servers, databases, data storage components, etc., which may include additional back-end components that are part of back-end components 120 (e.g., back-end components 120.3-120.4), or which may be separate from the back-end components 120 and not shown in FIG. 1A for purposes of brevity.

In embodiments, the network server 120.2 may be implemented as a web server and configured to support Internet communications with communication network 114 to facilitate communications with the various computing devices that navigate the retailer's hosted content, such as website content, for example, which may include secure content. For example, the network server 120.2 may receive requests for access to content from various computing devices in the form of communications via an Internet protocol, and the network server 120.2 may provide a level of access to hosted content based upon whether a user has provided the proper user authenticating information. For example, the network server 120.2 may initially host a website session in accordance with a signed-out state that only allows access to generic information.

In this signed-out state, the user may initially view other content provided by the retailer by navigating the retailer's website, submit requests for information, look up store location, browse online inventory and shop, etc. In any event, a user visiting a website hosted by the network server 120.2 may be identified, for example, when the user provides authentication information via a computing device such as logon credentials. If the authentication information is correct, the network server 120.2 may then transition the hosted web session to a signed-in state, allowing the user to access secure content during that particular session. However, embodiments include network server 102.2 providing an enhanced level of security to prevent a computing device from accessing secure content even, in some cases, when proper user authenticating information is provided. This enhanced level of security may be facilitated via cookie-stitching and non-cookie-stitching embodiments, which are separately discussed below in further detail.

Cookie-Stitching Embodiments

In accordance with cookie-stitching embodiments, the network server 120.2 may initially identify a particular computing device requesting access to hosted content, and provide information regarding the identified computing device to the cookie-stitching server 120.1 via communication network 114. Furthermore, the network server 120.2 may receive user authenticating information entered by or otherwise provided by a user via this computing device, which is utilized by the network server 120.2 to uniquely identify the user via an associated website ID, as discussed above. In embodiments, the network server 120.2 may also receive user record data from the cookie-stitching server 120.1 for this particular user, which is identified by the cookie-stitching server 120.1, as discussed above, by determining which one of several sets of user record data 140 (i.e., which agency ID) is associated with the identified computing device. As shown in FIG. 1B, the user record data 140 also contains a unique website ID, and the cookie-stitching server 120.1 may communicate to the network server 120.2 (e.g., via communication network 114), the entire user record associated with the identified user, or the website ID associated with that user. In this way, the network server 120.2 may identify a first website ID, which is associated with the user authenticating information, and a second website ID, which is associated with the user record data identified by the cookie-stitching server 120.1.

In embodiments, the network server 120.2 may be configured to determine whether the first and the second website IDs match one another. If so, then the network server 120.2 may grant the computing device access to secure content hosted by the network server 120.2, assuming that the user authenticating information is verified. However, if the two website IDs do not match one another, embodiments include the network server 120.2 requiring that conditions associated with two-factor authentication (2FA) be met in addition to verifying the user authenticating information, which is further discussed below. In other words, the network computing device may perform an additional verification by leveraging a second data source (i.e., the cookie-stitching server 120.1) that separately identifies a website ID. These two website IDs should match one another when the computing device currently attempting to access secure content hosted by the network server 120.2 is recognized by the cookie-stitching server 120.1 as being associated with the same user.

Additionally or alternatively, cookie-stitching embodiments may further include the network server 120.2 triggering 2FA in the event that the cookie-stitching server 120.1 cannot recognize the computing device. In other words, if no user record data can be retrieved because the computing device cannot be correlated to a particular user record (e.g., it is not contained in any of the user record data 140), then the cookie-stitching server 120.1 may send a notification to the network server 120.2 indicating that this is the case. Embodiments include the network server 120.2 triggering 2FA upon receipt of this notification. In this way, cookie-stitching embodiments provide an enhanced layer of security by advantageously utilizing the cookie-stitching server 120.1 to verify that a user is correctly associated with a specific and recognized computing device, and requiring that 2FA conditions be met when this is not the case.

Non-Cookie-Stitching Embodiments

In accordance with non-cookie-stitching embodiments, the network server 120.2 may initially identify a particular computing device requesting access to hosted content. Furthermore, the network server 120.2 may receive user authenticating information entered by or otherwise provided by a user via this computing device, which is utilized by the network server 120.2 to uniquely identify the user via an associated website ID, as discussed above. In embodiments, the network server 120.2 may store, access, update, and/or maintain the DMD 150, which includes various types of information associated with each unique website ID. Although the DMD 150 shown in FIG. 1B is associated with a single website ID, and thus a single user, embodiments include the DMD 150 including data for any suitable number of website IDs. Furthermore, although the DMD 150 includes five different device metrics (e.g., a device type, random number, browser type, screen size, and hash value or hash "token") embodiments include the DMD including any suitable type and/or number of device metrics.

For example, embodiments include the network server 120.2 being configured to log data for each computing device upon initially granting each computing device access to secure content (e.g., when user authenticating information is verified and/or other conditions are met, as discussed herein). The network server 120.2 may also be configured to store a data token onto each computing device as part of this process, which may represent a hashed value of one or more other device metrics, although the data token itself may also be considered a device metric, as further discussed herein. Then, during future visits from each computing device, the network server 120.2 may determine if a data token is present on the computing device and, if so, compare information contained in the data token to data stored in the DMD 150 for that uniquely identified computing device. Additionally, the network server 120.2 may be configured to present a user interface to allow users to view part or all of the information contained in the DMD 150 for their particular website ID, which may include information that is the user finds useful to ascertain which computing devices that should or should not be authorized to access the secure content. For example, the DMD 150 may store information regarding the device type, and a date, time, and place associated with the last successful sign-in for each uniquely identified computing device, in addition to other device metrics that are in discussed in further detail below.

This user interface is not shown for purpose of brevity, but may include any suitable type of user interface to enable a user to indicate whether each computing device, which is stored as part of the user's DMD (i.e., that user's website ID), is explicitly unauthorized to access secure content associated with that website ID. Once a user makes this selection, the DMD for that website ID is also updated, as shown in the DMD 150 in FIG. 1B. Upon receiving user authenticating information, embodiments include the network server 120.2 identifying an associated website ID, and executing different security protocols based upon whether the DMD, for that particular associated website ID, contains one or more computing devices that have been identified as unauthorized. The details of these security protocols are further discussed below.

Figure 2:
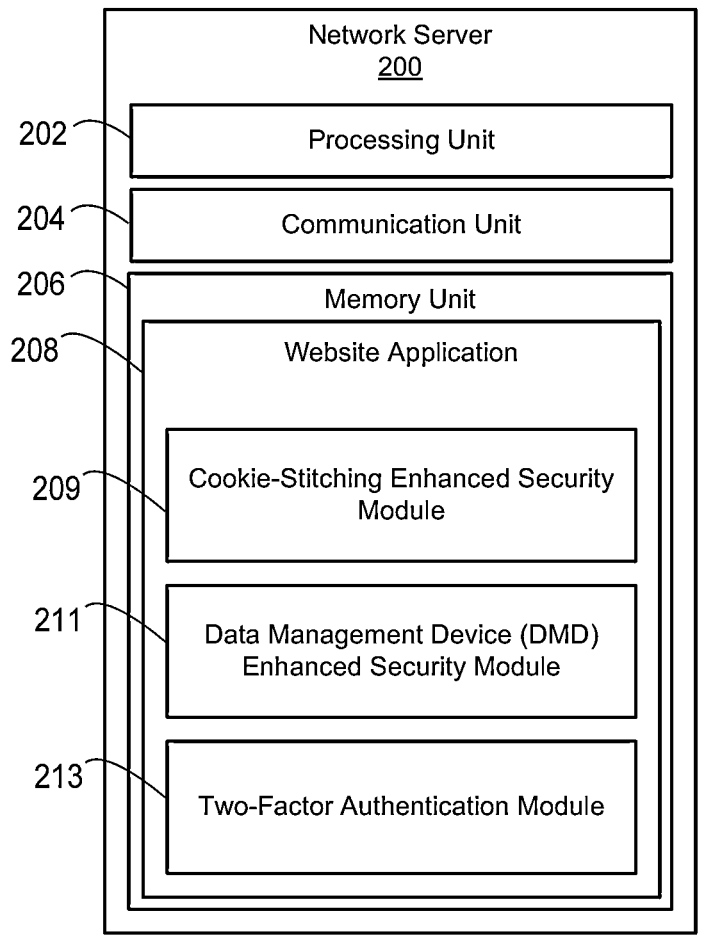
FIG. 2 is an example network server 200, in accordance with embodiments of the present disclosure.

FIG. 2 is a block diagram of an example network server 200, in accordance with embodiments of the present disclosure. In an embodiment, network server 200 may be an implementation of network server 120.2, for example, as shown in FIGS. 1A and 1B. In an embodiment, network server 200 may include a processing unit 202, a communication unit 204, and a memory unit 206. Network server 200 may include additional, fewer, or alternate components, including those discussed elsewhere herein. Moreover, network server 200 may be implemented as part of both cookie-stitching and non-cookie-stitching embodiments. The details associated with the functionality of network server 200 in each of these embodiments is further discussed below.

Generally speaking, the network server 200 may be configured to execute various installed applications to perform one or more functions of the embodiments as described herein. For example, network server 200 may be configured to execute a website application 208, which will be further discussed below. The website application 208 may be configured to enable network server 200 to perform various functions in conjunction with hardware components implemented by the network server 200, some of which may not be shown in FIG. 2 for purposes of brevity. For instance, the network server 200 may perform website hosting for one or more retailers or other entities, send and receive data via Internet communications (or other forms of communications) with other back-end components (e.g., cookie-stitching servers such as those discussed with reference to FIG. 1) and/or send and receive data via Internet communications (or other forms of communications) with other various computing devices as they navigate to the website, control access to secure hosted data during various web sessions, and allow users to navigate and otherwise interact with a website, as discussed herein.

To facilitate communications between the network server 200 and other computing devices and/or networks (e.g., the computing devices, communication network 114, and/or other back-end components 120 discussed above with respect to FIGS. 1A-B, etc.), communication unit 204 may be configured to support data communications in accordance with any suitable number and/or type of communication protocols. In various embodiments, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, antennas, etc.

Processing unit 202 may be implemented as any suitable type and/or number of processors, such as a host processor for the relevant device in which network server 200 is implemented, for example. Processing unit 202 may be configured to communicate with one or more of communication unit 204 and/or memory unit 206 to send data to and/or to receive data from one or more of these components, and/or to store data to and/or to read data from one or more of these components In accordance with various embodiments, memory unit 206 may be implemented as any suitable type of computer-readable non-transitory storage medium, and may include any suitable combination of volatile (e.g., a random access memory (RAM)), or non-volatile memory (e.g., battery-backed RAM, FLASH, etc.). In an embodiment, memory unit 206 may be configured to store instructions executable by processing unit 202. These instructions may include machine readable instructions that, when executed by processing unit 202, cause processing unit 202 to perform various acts.

In an embodiment, website application 208 is a portion of memory unit 206 configured to store instructions, that when executed by processing unit 202, cause processing unit 202 to perform various acts in accordance with applicable embodiments as described herein. The various modules of website application 208 may represent portions of web site application 208 that are associated with different respective functions. These portions may represent, for example, one or more algorithms, logic and code, executable instructions, programs, etc., to carry out specific tasks associated with the operation of website application 208, which are modularized in FIG. 2 for ease of explanation.

In cookie-stitching embodiments, cookie-stitching enhanced security module 209 ("module 209") may be a portion of memory unit 206 that, when executed by processing unit 202 in accordance with the website application 208, enables network server 200 to communicate with a cookie-stitching server (e.g., cookie-stitching server 120.1, as shown in FIGS. 1A-1B) to provide enhanced online security when a computing device (e.g., one of computing devices 104, 106, 108, and/or 110, as shown in FIG. 1A) attempting to access secure hosted content. In an embodiment, module 209 may facilitate network server 200 recognizing when a user has visited the hosted website and has provided user authenticating information, and looking up and storing a website identifier that is associated with the user authenticating information as part of the current web session. For example, if a user later returns to visit the hosted website from a different computing device, instructions stored in module 209 may allow the network server 200, or a cookie-stitching server in communication with the network server 200 (e.g., cookie-stitching server 120.1, as discussed with reference to FIGS. 1A-B), to be notified accordingly such that the user (and/or information associated with the user) may be determined. In various embodiments, instructions stored in module 209 may enable notifications (and other types of communications) to be sent from either the network server 200 to a cookie-stitching server, or vice versa, depending on the particular type of data monitoring implementation that is used.

For example, in "passive" data monitoring embodiments, instructions stored in module 209 may allow the network server 200 to initially attempt to identify a user by determining if the computing device is recognized (e.g., by determining whether an encrypted cookie is stored on the computing device, which may be placed onto the computing device from a previous web session). If the computing device cannot be recognized (e.g., because it is from a new and different computing device than one with a stored encrypted cookie), these embodiments include the network server 200 sending a notification to the cookie-stitching server. This notification may include, for example, a data flag and/or other information obtained via communication with the computing device used to currently navigate the website.

For example, the information may include data such as other cookies stored on the computing device, a unique device identifiers or other device information, browser information, etc. Further in accordance with such embodiments, the cookie-stitching server may receive this information, use one or more portions of the information to correlate the computing device to a particular agency ID and user record, and transmit this user record to the network server 200. The instructions stored in module 209 may facilitate the network server 200 identifying the website ID associated with the returned user record data, and determining whether the website identifier contained in the user record matches the website identifier associated with the received user authentication information. In the event that the two website identifiers match one another, the network server 200 may grant access to the secure content in accordance with the received user authentication information; otherwise, the network server 200 may require 2FA conditions to be met before granting the computing device access to the secure content, as further discussed herein.

To provide another example, in "active" data monitoring embodiments, instructions stored in module 209 may allow the network server 200 to receive and/or analyze notifications (and other communications) transmitted from the cookie-stitching server (or other suitable back-end components). Continuing this example, a cookie-stitching server may actively monitor web traffic to and/or from the website that is hosted by the network server 200, and/or actively communicate with computing devices visiting the website. In these scenarios, the cookie-stitching server may actively receive similar information discussed above with respect to passive data monitoring (e.g., other cookies stored on the computing device, a unique device identifier, browser information, etc.), without the network server 200 necessarily transmitting this information to the cookie-stitching server.

Again, once this information is obtained, the cookie-stitching server may use one or more portions of the information to correlate the computing device currently navigating the website to a particular agency ID and user record, and transmit the user record to the network server 200. Again, based upon whether the website ID contained in the user record matches the website identifier associated with the received user authentication information, the network server 200 may either grant access to the secure content in accordance with the received user authentication information, or require 2FA conditions to be met before doing so, as further discussed herein. In this way, active data monitoring embodiments may automatically provide the network server 200 with a user record for each user that visits the hosted website. These embodiments may be particularly useful, for example, to prevent the network server 200 from unnecessarily expending processing resources by offloading processing to the cookie-stitching server, thus conserving processing overhead.

In both active and passive data monitoring embodiments, user record information may be provided to the network server 200 in real time or near real time. For example, in passive data monitoring embodiments, the network server 200 may send notifications to, and receive user records from, the cookie-stitching server upon the network server 200 receiving user authenticating information from a particular computing device. Furthermore, in active data monitoring embodiments, the cookie-stitching server may send user records to the network server 200 upon the cookie-stitching server determining that a user visiting the hosted website is associated with a particular set of computing devices, browser information, unique device identifiers, cookies, etc.

Furthermore, in both active and passive data monitoring embodiments, the cookie-stitching server may transmit a notification to the network server 200 in the event that user record data cannot be found. In other words, if the cookie-stitching server is unable to identify the computing device and/or the user within any of the user record data (e.g., because insufficient data has been acquired and complied for that user or computing device and/or an agency ID does not exist containing that computing device), then the cookie-stitching server may transmit a notification to the network server 200. This notification may also be transmitted in real time or near real time as users visit the hosted website. In an embodiment, the instructions stored in module 209 may additionally facilitate network server 200 triggering 2FA upon receiving such a notification, and require 2FA conditions be met before granting the computing device access to the secure content. Additional details associated with the cookie-stitching embodiments facilitated by the network server 200 in this manner are further discussed below with reference to FIGS. 3 and 4.

In non-cookie-stitching embodiments, data management device (DMD) enhanced security module 211 ("module 211") may be a portion of memory unit 206 that, when executed by processing unit 202 in accordance with the website application 208, enables network server 200 to utilize and maintain a DMD to provide enhanced online security features when a computing device is attempting to access secure hosted content. This DMD may contain information regarding one or more computing devices that previously accessed the secure content associated with the website ID. The network server 200 may maintain, update, and access the DMD locally (e.g., in a suitable portion of memory unit 206) and/or remotely (e.g., by accessing the DMD that is stored on an external computing device such as database 120.4, for example, as shown in FIG. 1A).

To provide an illustrative example of the use of the DMD to provide enhanced security measures in accordance with non-cookie-stitching embodiments, the DMD 150 shown in FIG. 1B shows five different computing devices (computing devices 104.1, 104.2, 104.3, 106.1, and 106.2) each having previously provided the same user authenticating information to access secure hosted content, and are therefore associated with an example website ID "123456789." In the example shown in FIG. 1B, it is noted that the logged computing devices are associated with two different users (users 102.1 and 102.2, as shown in FIG. 1A), each being associated with different computing devices. This may be the case, for example, when two people willingly share user authenticating information to access one user's secure content. However, because circumstances may change over time, user 102.1 may decide at some point that he no longer wants the other user 102.2 to have access to this secure content. Therefore, as shown in FIG. 1B, a user may indicate (e.g., via a suitable web-based user interface, as discussed above) that the computing devices 106.1 and 106.2, which happen to be associated with user 102.2, are not authorized to access the secure content for the website ID "123456789" that is associated with the user 102.1.

Furthermore, the network server 200 may maintain the DMD 150 by analyzing each computing device that has provided the same user authenticating information over time. In doing so, the network server 200 may identify any suitable number and/or type of physical and/or operational aspects of each computing device, convert these aspects into numeric or alphanumeric values, and store these values in the DMD 150 as one or more device metrics. The conversion of device aspects into numeric or alphanumeric values may be performed in any suitable manner. For example, as shown in FIG. 1B, these device metrics may be associated with a device screen size in terms of pixels, a current browser used to access the website from each computing device, a type of computing device, etc. Additionally, upon initially granting each computing device access to secure content, the network server 120.2 may generate a random number via any suitable technique, which may further help to uniquely identify each individual computing device when subsequently requesting access to the secure content, as further discussed below. For example, upon initially granting each device access to secure content, the network server 120.2 may implement a Java cryptographically secure random bit generator to generate and store a random number for each computing device in the DMD 150 as an additional device metric.

The DMD may also include, as yet another device metric, a unique computing device identifier (UCDI), which may be generated by the network server 200 and stored as part of the DMD using any suitable combination of the aforementioned device metrics. For example, the UCDI may be generated based upon the various numeric values associated with the operational aspects (e.g., random number, browser information, etc.) and/or physical aspects (e.g., device type, screen size, etc.) associated with each computing device. In an embodiment, the network server 200 may generate the UCDI by first concatenating the numeric values associated with one or more of these metrics to generate a concatenated string. Once this concatenated value is generated, embodiments include processing unit 202 executing instructions stored in module 211 to facilitate network server 200 performing a hashing function on the concatenated string to generate a unique hash value for each computing device.

In an embodiment, this hashing function may be implemented as a one-way secure cryptographic hash algorithm (SHA), such as SHA-224, SHA-256, SHA-384, SHA-512, SHA-512/224, SHA-512/256, etc. Of course, embodiments include padding or truncating the concatenated string to accommodate the particular hashing function that is implemented. To provide an illustrative example, the DMD 150 shown in FIG. 1B includes information for website ID 123456789, which includes information associated with computing devices 104.2 and 106.1, which have identical device metrics other than their respective random numbers. Thus, by providing a random number as part of the input to the hashing function, greater assurance is achieved that the generated UCDI represents a truly unique identifier, even if other physical and/or operational aspects of two computing devices are identical.

In an embodiment, module 211 may further facilitate network server 200 storing one or more portions of information included in the DMD onto the computing device as part of a data token. In some embodiments, this may include the network server 200 storing the data token onto the computing device, but not the other device metrics in the DMD. In other words, as each computing device accesses secure content, the DMD may be updated with the aforementioned device metrics, and device metrics stored on the computing device may be later analyzed as part of the various security protocols (e.g., read from the computing device via browser data), as discussed further below. Upon a computing device providing user authenticating information to access secure content, module 211 may facilitate network server 200 accessing the DMD to determine which set of security protocols to utilize for that particular computing device.

This is further discussed below with reference to FIG. 5, and generally includes network 200 determining whether an identified website ID is associated with any computing devices that are unauthorized to access the secure content associated with that website ID. If no unauthorized computing devices are included in the DMD for that website ID, then network server 200 may execute a first security protocol that includes a first set of security verification conditions which, upon being satisfied, allow the user to access the secure content. The details regarding this first security protocol are further discussed below with reference to FIG. 6.

However, if the DMD indicates that the website ID is associated with any computing devices that are unauthorized to access the secure content, then network server 200 may execute a second security protocol that includes a second set of security verification conditions which, upon being satisfied, allow the user to access the secure content. The details regarding this second security protocol are further discussed below with reference to FIG. 7.

Regardless of whether the first or the second security protocol is executed by the network server 200, non-cookie-stitching embodiments include the network server 200 implementing 2FA in some circumstances in either case, although the second security protocol is considered to be a heightened one that implements 2FA in more circumstances than the first security protocol. Moreover, as discussed herein, the cookie-stitching embodiments may also implement 2FA in some circumstances. To facilitate this functionality in accordance with both cookie-stitching and non-cookie-stitching embodiments, two-factor authentication module 213 ("2FA module 213" or "module 213") may be a portion of memory unit 206 that, when executed by processing unit 202 in accordance with the website application 208, enables network server 200 to execute 2FA and determine whether the various conditions of the 2FA are met.

Embodiments include network 200 executing 2FA in accordance with any suitable techniques, which generally require that additional verification be performed by receiving a specific type of 2FA data via a specific type of device. For example, the one or more conditions associated with 2FA may include network server 200 generating and transmitting an alphanumeric code to a computing device (e.g., in a text message, email, etc.), requesting the alphanumeric code be entered via the computing device, and verifying that the received alphanumeric code matches the transmitted alphanumeric code. To provide another example, the one or more conditions associated with 2FA may include network server 200 sending a request for biometric information that is entered via a computing device. In such a case, the network server 200 may verify whether the received biometric information matches known biometric data (e.g., biometric data that is stored as part of the user's secure content or otherwise accessed by the network server 200).

In various embodiments, the computing device to which the 2FA data (e.g., an alphanumeric code, biometric information request, etc.) is sent to and received from may be the same device that is currently accessing the website (e.g., the one from which the user authenticating information is received), or sent to and received by another computing device. For example, the user may register or otherwise specify a computing device, email address, phone number, etc., for 2FA purposes, which may be contained as part of the user's secure content or otherwise accessed by the network server 200. This information may then be utilized by the network server 200 to transmit the 2FA data and/or any 2FA data requests to that particular device.

The following method flows 300, 400, 500, 600, and 700, which are discussed in further detail below with reference to FIGS. 3, 4, 5, 6, and 7, respectively, describe various processes in accordance with cookie-stitching and non-cookie-stitching embodiments to provide enhanced online security measures. The method flows 300 and 400 are directed to cookie-stitching embodiments, whereas the method flow 500, 600, and 700 are directed to non-cookie-stitching embodiments. In various embodiments, one or more portions of each of these method flows (or the entire method flow) may be implemented by any suitable device, and one or more portions of each respective method flow may be performed by more than one suitable device in combination with one another. For example, one or more portions of each respective method flow may be performed by network server 120.2 or network server 200, as shown in FIGS. 1A-1B and FIG. 2. In an embodiment, each respective method flow may be performed by any suitable combination of one or more processors, applications, algorithms, and/or routines.

For example, each respective method flow may be performed via processing unit 202 executing instructions stored in website application 208 and/or any modules contained therein, as shown and discussed with reference to FIG. 2. In embodiments, method flows 300 and 400 (i.e., the cookie-stitching embodiments) may be performed via processing unit 202 executing instructions stored in cookie-stitching enhanced security module 209, whereas method flows 500, 600, and 700 (i.e., the non-cookie-stitching embodiments) may be performed via processing unit 202 executing instructions stored in data management device enhanced security module 211. Moreover, in both cookie-stitching and non-cookie-stitching embodiments, 2FA may be utilized at various stages and based upon various conditions. Embodiments include 2FA being facilitated via execution of instructions stored in two-factor authentication module 213 via processing unit 202, for both cookie-stitching and non-cookie-stitching embodiments.

Figure 3:
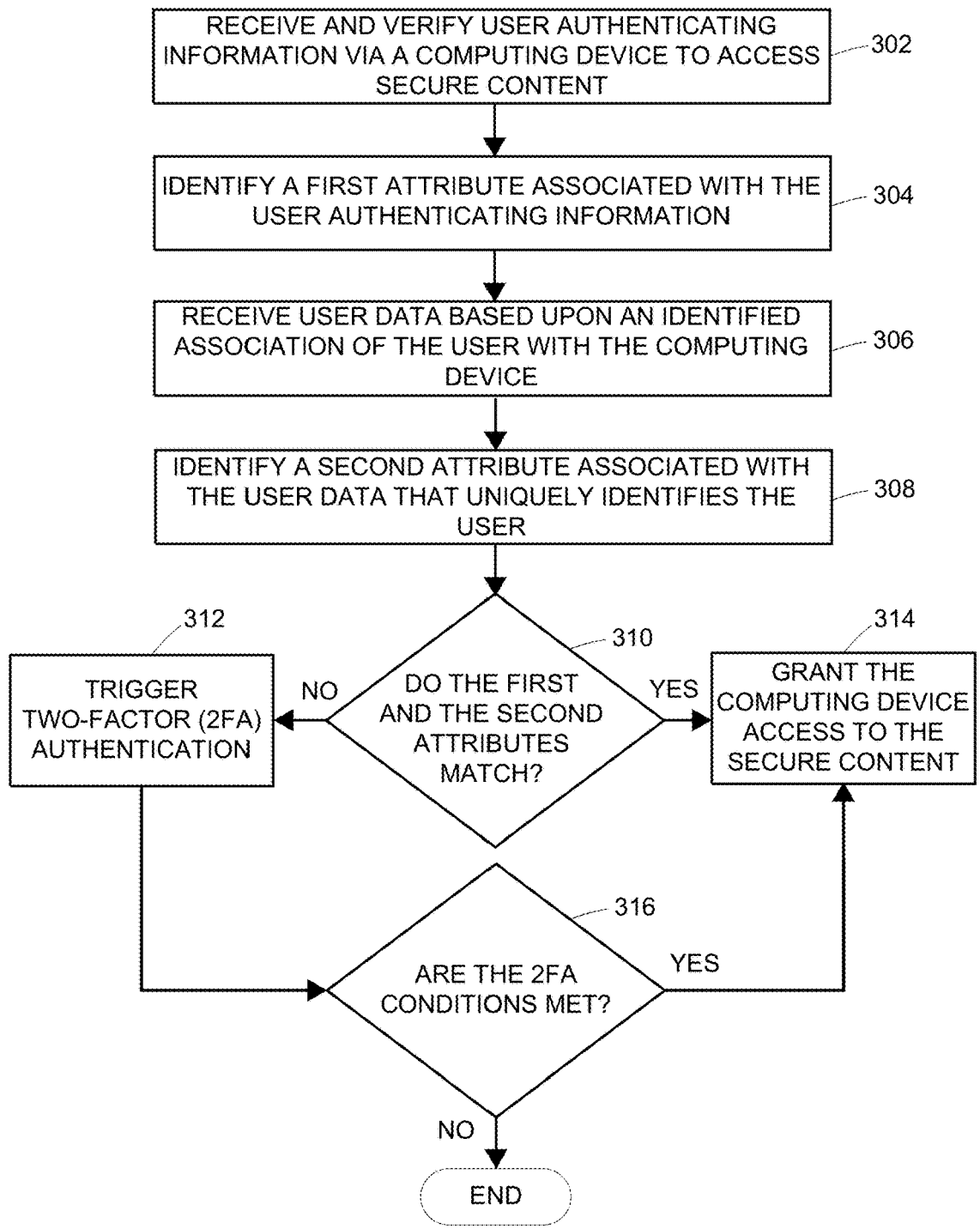
FIG. 3 illustrates a method flow 300, in accordance with embodiments of the present disclosure.

FIG. 3 illustrates a method flow 300, in accordance with embodiments of the present disclosure. Method flow 300 may start when one or more processors receive and verify user authenticating information that is provided via a computing device attempting to access secure content that is hosted by a network server (block 302). In an embodiment, this may include a user navigating to a website via a computing device, for example, resulting in the network server communicating with the first computing device to receive user authenticating information that is provided by the user to access his or her secure content that is stored or otherwise hosted by the network server (block 302). As an initial measure, the received user authenticating information may be verified via the network server determining whether the supplied user authenticating information matches known authenticating information associated with the secure content (block 302). To provide an illustrative example with reference to FIGS. 1A-1B, this may include user 102.1 visiting the retailer's website via computing device 104.1. The illustrated method flow 300 shown in FIG. 3 assumes that the user authenticating information is verified. Of course, improper user authentication information would prevent access to the user's secure content.

Method flow 300 may include one or more processors identifying a first attribute associated with the received user authenticating information that uniquely identifies the user (block 304). This may include, for example, identifying a website ID associated with the user authenticating information that is used by the network server to identify the user during a browsing session (block 304). Continuing the illustrative example with reference to FIGS. 1A-1B, this may include the network server associating the user 102.1 with the website ID 123456789.

Method flow 300 may include one or more processors receiving user data from an external computing device based upon an identified association of the user with the computing device (block 306). This may include, for example, receiving user record data and/or other information associated with a user record from a cookie-stitching server (e.g., a website ID), as discussed herein (block 306). This information may be received, for example, in accordance with the active or the passive data monitoring embodiments as discussed above with reference to FIG. 2 (block 306). Again, this may include the cookie-stitching server identifying a particular user record associated with an identified agency ID using data such as cookie data, unique device identifiers, browser information, etc. (block 306). Continuing the previous illustrative example with reference to FIGS. 1A-1B, if the user authenticating information is received (block 302) via computing device 104.1, then the cookie-stitching server may identify the user record data associated with agency ID 123, and communicate all, or part of this user record data, to the network server (block 308). However, if the user authenticating information is received (block 302) from computing device 106.1, then the cookie-stitching server may identify the user record data associated with agency ID 456, and communicate all, or part of this user record data, to the network server (block 306).

Method flow 300 may include one or more processors identifying a second attribute associated with the received user record data that uniquely identifies the user (block 308). This may include, for example, identifying a website ID contained in the user record data (block 308). Continuing the illustrative example with reference to FIGS. 1A-1B, in the event that the computing device providing the user authenticating information is one of computing devices 104.1, 104.2, or 104.3, this may include the network server identifying the user as one having website ID 123456789, from the user record associated with the agency ID 123. Alternatively, in the event that the computing device providing the user authenticating information is one of computing devices 106.1 or 106.2, this may include the network server identifying the user as one having website ID 456123987, from the user record associated with the agency ID 456.

In other words, the network server may identify a website ID based upon the received user authenticating information regardless of the particular computing device provides this information. But the cookie-stitching server may identify the website ID based upon an agency ID that is correlated to information associated with the particular computing device providing the user authenticating information and/or other aspects associated with the user, as previously discussed (block 308).

Method flow 300 may include one or more processors determining whether the first and second attributes (e.g., website IDs) match one another (block 310). This may include, for example, a string comparison or any other suitable data comparison technique (block 310). If so, then method flow 300 may include one or more processors granting the computing device access to the secure content (block 314). If not, then method flow 300 may include one or more processors triggering two-factor authentication (block 312), which may include the network server generating and transmitting 2FA data (block 312).

Continuing the previously illustrative examples, a user may provide user authenticating information via any of computing devices 104.1, 104.2, 104.3, 106.1 or 106.2. In the event that the user provides user authenticating information via one of computing devices 104.1, 104.2, or 104.3, then the website ID 123456789 associated with the user authenticating information would match the website ID 123456789 contained in the user record data received from the cookie-stitching server, and thus 2FA would not be triggered. However, in the event that the user provides user authenticating information via one of computing devices 106.1 or 106.2, then the website ID 123456789 associated with the user authenticating information would not match the website ID 456123987 contained in the user record data received from the cookie-stitching server, and thus 2FA would be triggered (and the 2FA conditions may be verified via one of the computing devices 104.1, 104.2, or 104.3). In this way, cookie-stitching embodiments provide an enhanced layer of security by determining whether user authenticating information matches an expectation for that particular computing device.

In the event that 2FA is triggered (block 312), method flow 300 may include one or more processors determining whether the 2FA conditions are met (block 316). Again, the one or more 2FA conditions may include verifying that received 2FA data and/or requests for specific types of data to specific types of computing devices match known or expected values, as discussed herein (block 316). If so, then method flow 300 may include one or more processors granting the computing device access to the secure content (block 314). If not, then method flow 300 may end, which may include the one or more processors blocking access to the secure content, displaying an indication that 2FA has failed, etc.

Figure 4:
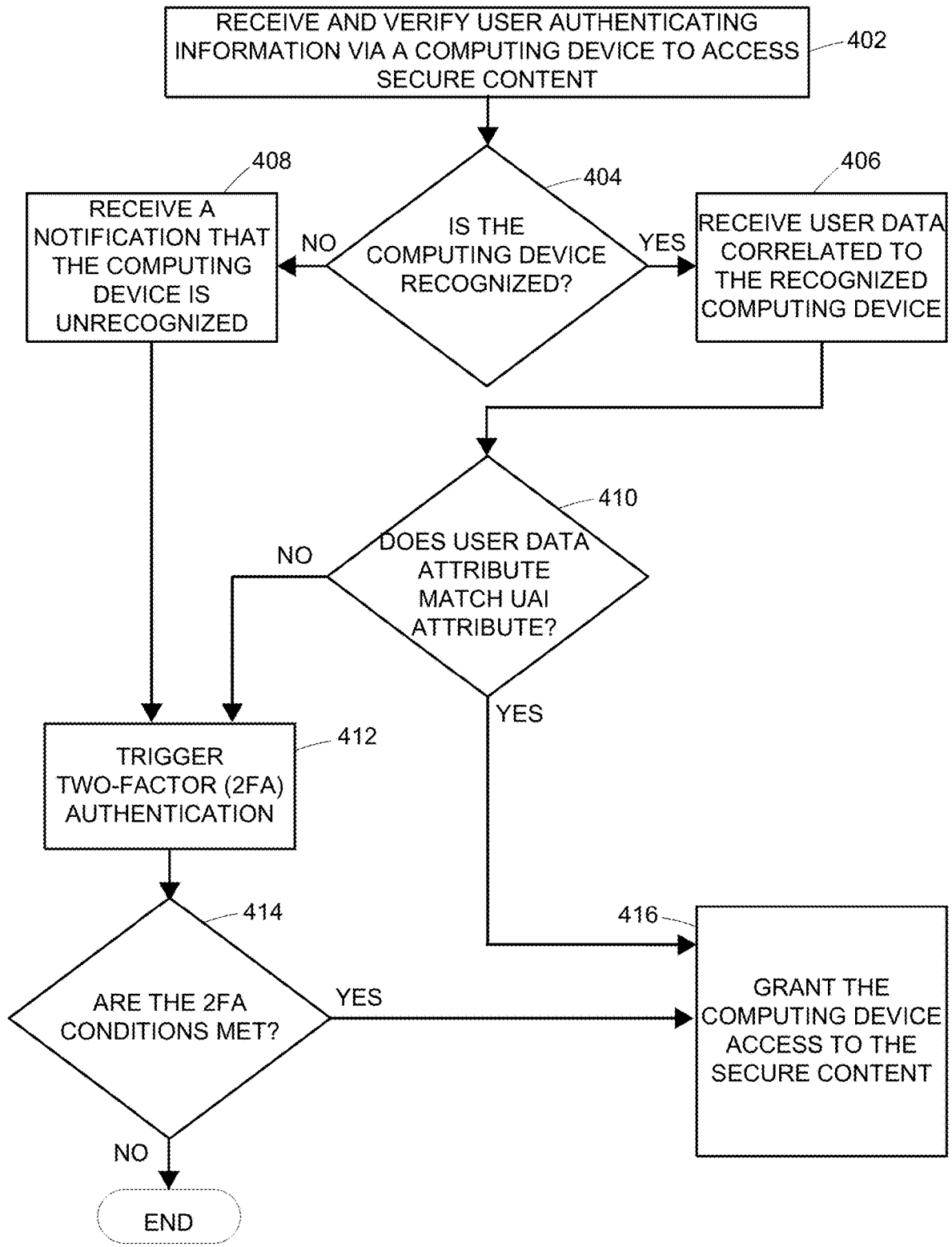
FIG. 4 illustrates a method flow 400, in accordance with embodiments of the present disclosure.

FIG. 4 illustrates a method flow 400, in accordance with embodiments of the present disclosure. Method flow 400 may start when one or more processors receive and verify user authenticating information that is provided via a computing device attempting to access secure content that is hosted by a network server (block 402). In an embodiment, this may include a user navigating to a website via a computing device, for example, resulting in the network server communicating with the first computing device to receive user authenticating information that is provided by the user to access his or her secure content that is stored or otherwise hosted by the network server (block 402). As an initial measure, the method flow 400 may also include the received user authenticating information being verified, i.e., the network server determining whether the supplied user authenticating information matches known authenticating information associated with the secure content (block 402). To provide an illustrative example with reference to FIGS. 1A-1B, this may include user 102.1 visiting the retailer's website via computing device 104.1. The method flow 300 shown in FIG. 4 assumes that the user authenticating information is verified. Of course, improper user authentication information would have an equivalent effect of preventing access to the secure content.

Moreover, method flow 400 may include the one or more processors identifying a user authenticating information (UAI) attribute associated with the received user authenticating information that uniquely identifies the user (block 402). This may include, for example, identifying a website ID associated with the user authenticating information, which is used by the network server to identify the user during a browsing session (block 402). Continuing the illustrative example with reference to FIGS. 1A-1B, this may include the network server associating the user 102.1 with the website ID 123456789.

Method flow 400 may include one or more processors determining whether the computing device is recognized (block 404). This may include, for example, the network server communicating with a cookie-stitching server, which attempts to identify an agency ID containing the computing device and/or other correlated information, as discussed above (block 404).

If the cookie-stitching server recognizes the computing device, then the cookie-stitching server may identify the user record data associated with a particular correlated agency ID, and communicate all, or part of this user record data, to the network server (block 406). The network server may then identify a user record attribute (e.g., a website ID) contained in the user record data (block 406). Continuing the illustrative example with reference to FIGS. 1A-1B, in the event that the computing device providing the user authenticating information is one of computing devices 104.1, 104.2, or 104.3, this may include the network server identifying the user as one having website ID 123456789, from the user record associated with the agency ID 123. Alternatively, in the event that the computing device providing the user authenticating information is one of computing devices 106.1 or 106.2, this may include the network server identifying the user as one having website ID 456123987, from the user record associated with the agency ID 456.

However, if the cookie-stitching server cannot recognize the computing device, and a user record cannot be returned, then method flow 400 may include the cookie-stitching server transmitting a notification, which is received by the network server, indicating that this is the case (block 408). If so, then method flow 400 may include one or more processors triggering 2FA (block 412), which may include the network server generating and transmitting 2FA data, requesting 2FA data be entered via a computing device, etc. (block 412).

Method flow 400 may include one or more processors determining whether the user data attribute, which was received from the cookie-stitching server, matches the UAI attribute that was identified by the network server (block 410). This may include, for example, a string comparison or any other suitable data comparison technique (block 410). If so, then method flow 400 may include one or more processors granting the computing device access to the secure content (block 416). If not, then method flow 400 may include one or more processors triggering 2FA (block 412).

In the event that 2FA is triggered, method flow 400 may include one or more processors determining whether the 2FA conditions are met (block 414). Again, the one or more 2FA conditions may include verifying that received 2FA data and/or requests for specific types of data to specific types of computing devices match known or expected values, as discussed herein (block 414). If so, then method flow 400 may include one or more processors granting the computing device access to the secure content (block 414). If not, then method flow 400 may end, which may include the one or more processors blocking access to the secure content, displaying an indication that 2FA has failed, etc.

Figure 5:
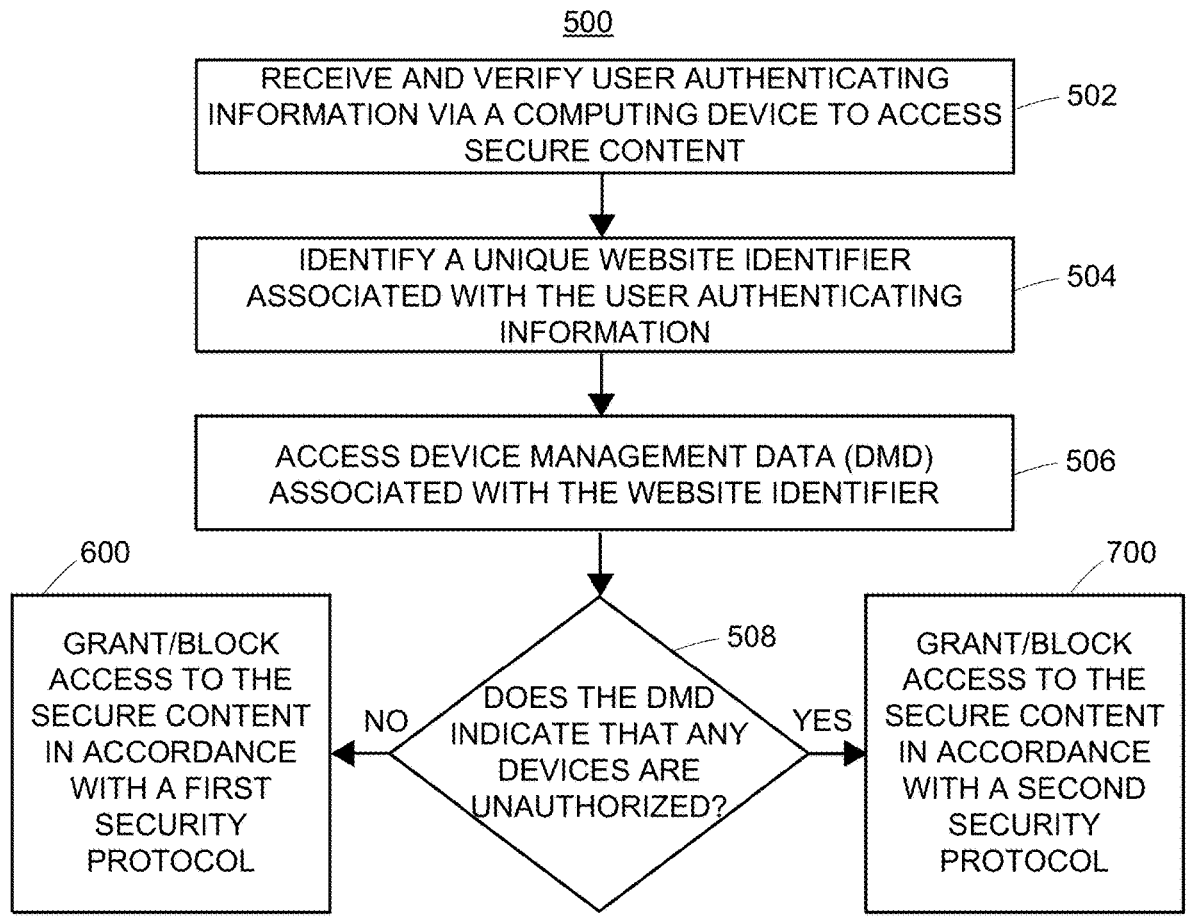
FIG. 5 illustrates a method flow 500, in accordance with embodiments of the present disclosure.

FIG. 5 illustrates a method flow 500, in accordance with embodiments of the present disclosure. Method flow 500 may start when one or more processors receive and verify user authenticating information that is provided via a computing device attempting to access secure content that is hosted by a network server (block 502). In an embodiment, this may include a user navigating to a website via a computing device, for example, resulting in the network server communicating with the first computing device to receive user authenticating information that is provided by the user to access his or her secure content that is stored or otherwise hosted by the network server (block 502). As an initial measure, the method flow 500 may also include the received user authenticating information being verified, i.e., the network server determining whether the supplied user authenticating information matches known authenticating information associated with the secure content (block 502). To provide an illustrative example with reference to FIGS. 1A-1B, this may include user 102.1 visiting the retailer's website via computing device 104.1. The illustrated method flow 500 shown in FIG. 5 assumes that the user authenticating information is verified. Again, improper user authentication information would have an equivalent effect of preventing access to the secure content.

Method flow 500 may include one or more processors identifying a unique website identifier associated with the received user authenticating information that uniquely identifies the user (block 504). This may include, for example, identifying a website ID associated with the user authenticating information that is used by the network server to identify the user during a browsing session (block 504). Continuing the illustrative example with reference to FIGS. 1A-1B, this may include the network server identifying the user 102.1 as being associated with the website ID 123456789.

Method flow 500 may include one or more processors accessing device management data (DMD) associated with the user authenticating information (block 506). This may include, for instance, accessing a DMD associated with the identified website identifier (block 504) that is associated with the user authenticating information (block 506). Continuing the previous illustrative example with reference to FIGS. 1A-1B, if the user authenticating information is received (block 502) from computing device 104.1, then the network server may access the DMD associated with website ID 123456789, as shown in the DMD 150 pictured in FIG. 1B.

Method flow 500 may include one or more processors determining whether the DMD indicates that any computing devices contained in the DMD for the website ID are unauthorized to access the secure content (block 508). This may include, for example, identifying, for each respective computing device in the DMD, a flag, one or more data bits, or any other suitable indicator (block 508). If the DMD does not indicate that any computing devices are unauthorized (i.e., the DMD includes only authorized computing devices), then method flow 500 may continue to grant or block access to the secure content in accordance with a first security protocol that includes a first set of security verifications (block 600), further details of which are provided with reference to FIG. 6.

Figure 7:
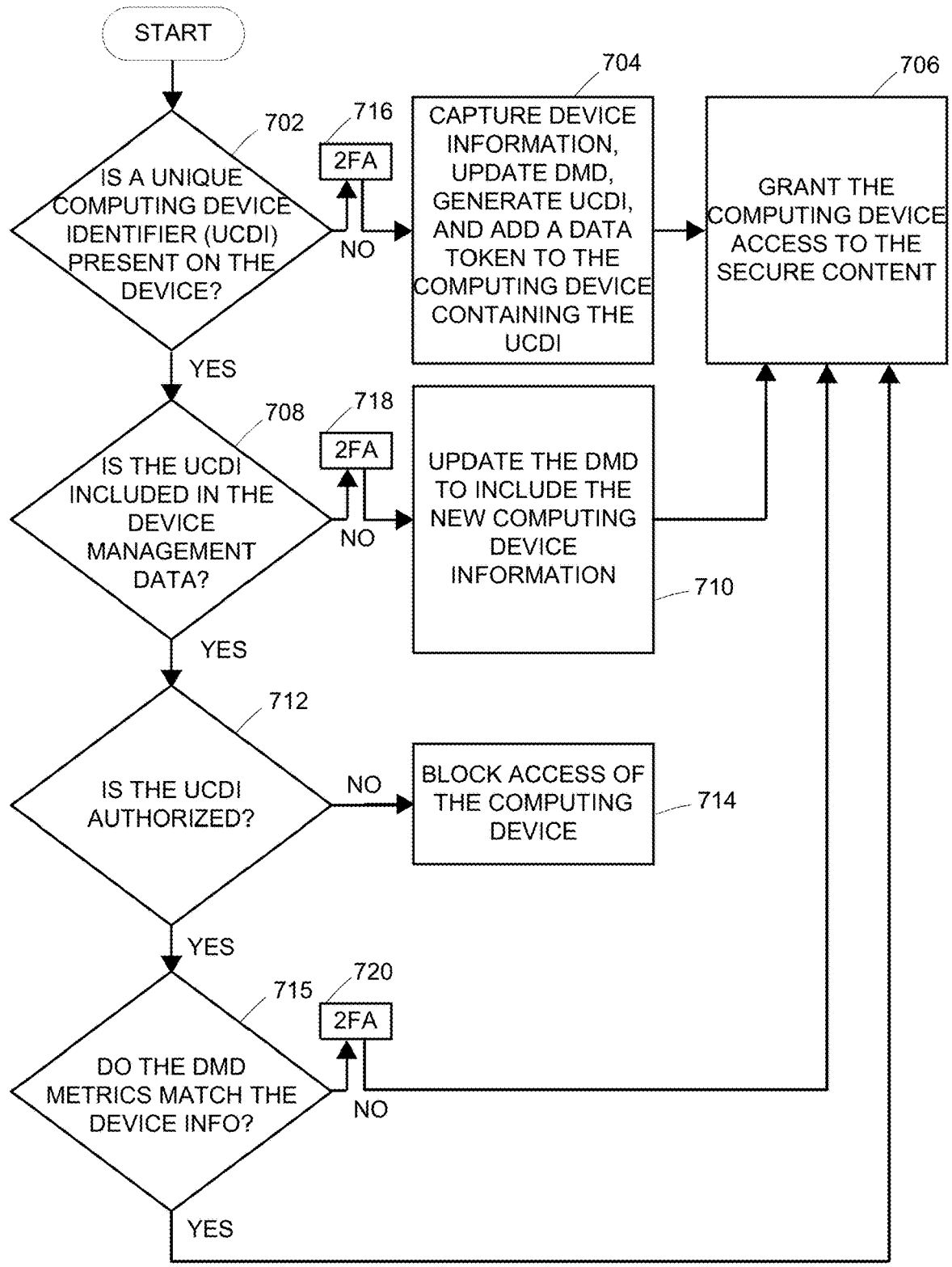
FIG. 7 illustrates a method flow 700, in accordance with embodiments of the present disclosure.

However, if the DMD indicates that one or more computing devices is unauthorized to access the secure content, then method flow 500 may continue to grant or block access to the secure content in accordance with a second security protocol that includes a second set of security verifications (700), further details of which are provided with reference to FIG. 7. Continuing the previous illustrative example with reference to FIGS. 1A-1B, the DMD 150 includes an indication that the computing devices 106.1 and 106.2, which are associated with a different user 102.2, are unauthorized to access the secure content. In this scenario, method flow 500 would continue to continue to grant or block access to the secure content in accordance with the second set of security verifications (700).

Figure 6:
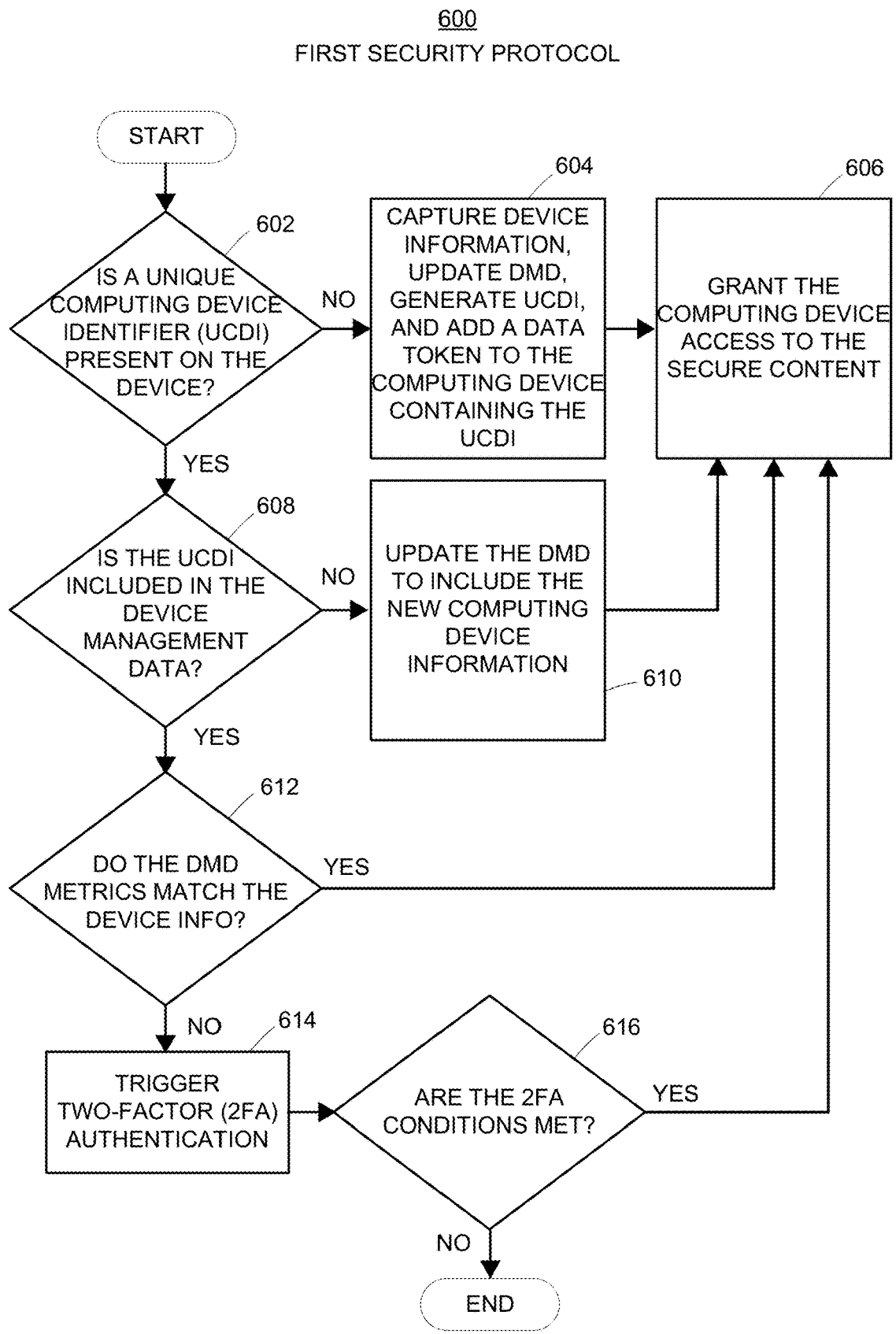
FIG. 6 illustrates a method flow 600, in accordance with embodiments of the present disclosure.

FIG. 6 illustrates a method flow 600, in accordance with embodiments of the present disclosure. Again, the method flow 600 represent a first security protocol that is triggered when the DMD for a particular website ID indicates that each computing device is authorized to access secure content (i.e., the DMD does not indicate that any computing devices are unauthorized). The first security protocol includes a set of security verifications, which are shown in FIG. 6 as the various decision blocks 602, 608, 612, and 616, the details of which are further discussed below.

Method flow 600 may start with a first security verification by one or more processors determining whether a unique computing device identifier (UCDI) exists on the computing device (block 602). This UCDI may include, for example, a unique hash value that is stored as part of a data token on the computing device, as discussed above and shown in the DMD 150 illustrated in FIG. 1B (block 602). In other words, the data token and the UCDI included in the data token should include a specific format, length, type, etc., that is recognized by the network server. This specific type of UCDI should exist on computing devices that have previously accessed the secure content via the network server in accordance with either the first or the second security protocols, as will be further clarified below. Continuing the previous illustrative example from FIG. 5, in the event that the computing device 104.1 provides user authenticating information, and assuming that the hash values included in DMD 150 represents SHA-256 hashed values, method flow 600 includes one or more processors determining whether the computing device 104.1 includes stored data token having a UDCI that matches the type of data format that is expected in accordance with an SHA-256 hashing function (block 602).

If the expected UCDI is not identified on the computing device, then method flow 600 may include one or more processors updating the DMD with the computing device information, and generating and storing a data token on the computing device (block 604). For example, the network server may capture device information by reading the one or more device metrics such as device type, screen size, browser type, etc., as shown in DMD 150 in FIG. 1B. Furthermore, method flow 600 may include generating a random number and updating the DMD with this information for that particular computing device (block 604). Moreover, method flow 600 may include the one or more processors generating the UCDI (e.g., as a hashed value of one or more of the concatenated device metrics), generating a data token from the concatenation of one or more of these device metrics, and storing the data token onto the computing device (block 604).

Upon updating the DMD for the current website ID and storing the data token onto the computing device (block 604), method flow 600 may include one or more processors granting the computing device access to the secure content (block 606). Moreover, embodiments include the network server transmitting any suitable type of notification upon granting the computing device access to the secure content (block 606). For example, if the computing device does not include a UCDI and the device information is captured (block 604), then method flow 600 may include one or more processors sending an email, a text message, etc. to a primary or default computing device associated with the website ID, notifying the user that a new computing device has signed in with that website ID (block 606).

In this way, computing devices that initially fail the first security verification may pass it the next time that same computing device attempts to access the secure content by providing the same user authenticating information. That is, the network server, on subsequent secure content access requests, may then recognize the UCDI stored in the data token on the computing device, resulting in the computing device passing the first security verification check (block 602—YES).

Upon passing the first security verification, the method flow 600 may include one or more processors continuing to perform a second security verification (block 608). This second security verification may include one or more processors determining whether the unique computing device identifier (UCDI) stored on the computing device matches the UCDI stored in the DMD for that website ID during the current session (block 608). Continuing the previous illustrative example with the computing device 104.1, method flow 600 includes one or more processors determining whether the UCDI stored on the computing device 104.1 matches any of the UCDIs contained in the DMD 150, which is "417a1cb7313bb67eabf58d" in this example (block 608). If not, then method flow 600 may include one or more processors updating the DMD with the one or more device metrics retrieved from the computing device 104.1 (including the UCDI) (block 610).

Upon updating the DMD to include the new computing device information (block 610), method flow 600 may include one or more processors granting the computing device access to the secure content (block 606). Again, embodiments include the network server transmitting any suitable type of notification upon granting the computing device access to the secure content to notify the user that a new computing device has signed in with that website ID (block 606).

The second security verification may fail (block 608—NO), for example, when a user has previously provided different user authenticating information associated with a different website ID to access a different set of secure content using the same computing device in each case. In other words, as a result of previously accessing the secure content with a different set of user authenticating information, the computing device would store a data token including a UCDI (blocks 604 and 606). However, this UCDI would not be contained in the DMD for a separate, different website ID associated with a different set of user authenticating information (i.e., for another user). However, as a result of updating the DMD, computing devices that initially fail the second security verification check may pass it the next time that same computing device attempts to access the secure content with the same user authenticating information. That is, because the DMD for a particular website ID is updated to include the new computing device information (block 610), the network server, on subsequent secure content access requests, may recognize the UCDI as being included in the DMD, thus resulting in the computing device passing the second security verification (block 608—YES).

Upon passing the second security verification, the method flow 600 may include one or more processors continuing to perform a third security verification (block 612). This third security verification may include one or more processors determining whether one or more device metrics associated with the computing device match one or more device metrics contained in the DMD for that same computing device (block 612). Continuing the previous illustrative example with the computing device 104.1, the second security verification may result in a determination that the UCDI stored on the computing device 104.1 matches a UCDI stored in the DMD 150, which should correspond to the current device given that the UCDI is unique in nature. However, as an additional security measure, one or more additional device metrics may be read from the computing device, for example, via the web browser used by the computing device when requesting secure content access. In an embodiment, one or more of these read device metrics may be compared to those in the DMD 150 for the computing device (e.g., computing device 104.1) (block 612).

For example, method flow 600 may include one or more processors comparing one or more alphanumeric values, characters, strings, etc., retrieved from the computing device 104.1, which are associated with device metrics such as the screen size, device type, browser information, etc., to the one or more respective device metrics stored in the DMD 150 (block 612), and associated with this same computing device 104.1. In various embodiments, the third security verification may compare any number of these device metrics based upon the desired level of security that is sought to be achieved. For instance, all device metrics within the DMD may be compared (in addition to the UCDI) to maximize security, whereas a lesser number of device metrics (in addition to the UCDI) may be compared if such a level of security is not desired. In any event, if the one or more device metrics stored in the computing device match one or more respective device metrics contained in the DMD for that same computing device, method flow 600 may include one or more processors granting the computing device access to the secure content (block 606).

The third security verification may fail (block 612—NO), for example, when a user steals or copies a data token from one computing device to another and attempts to access secure content via a different computing device than one stored in the DMD. In this case, one or more device metrics associated with the computing device having the stolen UCDI may differ from those stored in the DMD, triggering 2FA (block 614). Again, 2FA may include the network server generating and transmitting 2FA data, requesting 2FA data be entered via a computing device, etc. (block 614).

In the event that 2FA is triggered (block 614), method flow 600 may include one or more processors determining whether the 2FA conditions are met (block 616). Again, the one or more 2FA conditions may include verifying that received 2FA data and/or requests for specific types of data to specific types of computing devices match known or expected values, as discussed herein (block 616). If so, then method flow 600 may include one or more processors granting the computing device access to the secure content (block 606). If not, then method flow 600 may end, which may include the one or more processors blocking access to the secure content, displaying an indication that 2FA has failed, etc.

FIG. 7 illustrates a method flow 700, in accordance with embodiments of the present disclosure. Again, the method flow 700 represents a second security protocol that is triggered when the DMD, for a particular website ID, indicates that at least one computing device is not authorized to access the secure content. The second security protocol includes a separate set of security verifications from those previously discussed with respect the first security protocol, which are represented in FIG. 7 as the various decision blocks 702, 708, 712, 715, and the 2FA blocks 716, 718, and 720, the details of which are further discussed below.

Method flow 700 may start with a first security verification by one or more processors determining whether a unique computing device identifier (UCDI) exists on the computing device (block 702), in a similar manner as discussed with reference to method flow 600 (block 602). However, the first security verification included in the second security protocol (block 702) differs from the first security verification included in the first security protocol (block 602) in that 2FA is triggered in the event that an expected UCDI type is not identified on the computing device (block 716).

In an embodiment, the additional 2FA security verifications (blocks 716, 718, and 720) may represent a combination of 2FA functionality associated with blocks 614 and 616, as shown and discussed with reference to FIG. 6. In other words, each 2FA block 716, 718, and 720 may represent 2FA being triggered, as discussed with respect to block 614. Moreover, as illustrated in FIG. 7, the flow from each respective block 716, 718, and 720 assumes that any relevant 2FA conditions have been met, as discussed with respect to block 616. Of course, in the event that any of the 2FA conditions are not met at any one of the respective blocks 716, 718, or 720, then the method flow 700 may end, which may include the one or more processors blocking access to the secure content, displaying an indication that 2FA has failed, etc.

Assuming that the 2FA conditions are met (block 716), method flow 700 may continue to capture one or more device metrics from the computing device, update the DMD with the computing device information, and generate and store a data token onto the computing device (block 704) in a similar manner as discussed with reference to method flow 600 (block 604). Upon updating the DMD for the current website ID and storing the data token onto the computing device (block 704), method flow 700 may include one or more processors granting the computing device access to the secure content (block 706). As discussed above with reference to FIG. 6, embodiments also include the network server transmitting any suitable type of notification upon granting the computing device access to the secure content, thus notifying the user that a new computing device has signed in with that website ID (block 706).

Upon passing the first security verification, the method flow 700 may include one or more processors continuing to perform a second security verification (block 708) in a similar manner as discussed with reference to method flow 600 (block 608). Once again, the second security verification included in the second security protocol (block 708) differs from the second security verification included in the first security protocol (block 608) in that 2FA is triggered in the event that the unique computing device identifier (UCDI) stored on the computing device does not match any UCDIs stored in the DMD for the website ID during the current session (block 718).

Assuming that the 2FA conditions are met (block 718), method flow 700 may continue to update the DMD with one or more device metrics that are stored in a data token on the computing device (block 710) in a similar manner as discussed with reference to method flow 600 (block 610). Upon updating the DMD to include the new computing device information (block 710), method flow 700 may include one or more processors granting the computing device access to the secure content (block 706). Again, embodiments also include the network server transmitting any suitable type of notification upon granting the computing device access to the secure content notifying the user that a new computing device has signed in with that website ID (block 706).

Upon passing the second security verification, the method flow 700 may include one or more processors continuing to perform a third security verification (block 712), which is unique to the second security protocol. In an embodiment, method flow 700 includes one or more processors determining whether a UCDI matches a computing device stored in the DMD that is unauthorized to access the secure content (block 712). To provide an illustrative example with reference to FIGS. 1A-1B, a user may provide the proper user authenticating information via computing device 106.1, which is indicated in the DMD 150 as being unauthorized to view secure content associated with the website ID 123456789. If the computing device 106.1 previously accessed the secure content, the UCDI stored on the computing device 106.1 would be recognized as part of the DMD 150, and thus the computing device 106.1 would pass the first (block 702) and the second (block 708) security verifications. However, because a user explicitly indicated that the computing device 106.1 is not authorized to view the secure content, embodiments include the network server blocking access of the computing device 106.1 to the secure content, as the computing device would fail the third security verification (block 712—NO and block 714). In this way, non-cookie-stitching embodiments provide enhanced security by uniquely identifying computing devices, and restricting access to secure content by allowing users to explicitly authorize access to secure content on a per-device basis. Therefore, once uniquely recognized, computing device 106.1 is blocked without triggering 2FA, and cannot access the secure content even if the proper user authenticating information is provided and the computing device contains a UCDI matching one included in the DMD.

Upon passing the third security verification, the method flow 700 may include one or more processors continuing to perform a fourth security verification (block 715) in a similar manner as discussed with reference to method flow 600 (block 612). In this case, failure of the fourth security verification included in the second security protocol (block 715), like the third security verification included in the first security protocol (block 612), likewise triggers 2FA (i.e., if one or more device metrics stored in the computing device do not match one or more device metrics contained in the DMD for that same computing device) (block 715).

Assuming that the 2FA conditions are met (block 720), method flow 700 may continue to grant the computing device access to the secure content (block 706). Of course, in the event that the one or more device metrics stored in the computing device match the one or more device metrics contained in the DMD for that same computing device (block 715), 2FA is not required (block 715—YES), and the computing device is granted access to the secure content (block 706).

Technical Advantages

The cookie-stitching and the non-cookie-stitching embodiments described herein may be implemented as part of one or more computer components, such as computing devices and/or one or more back-end components. Furthermore, the cookie-stitching and the non-cookie-stitching embodiments described herein may be implemented as part of a computer network architecture that facilitates communications between various other devices and/or components. Thus, the cookie-stitching and the non-cookie-stitching embodiments described herein address and solve issues of a technical nature that are necessarily rooted in computer technology.

For instance, cookie-stitching embodiments include cross-identifying users and user information when visiting a website from different computing devices at different times by leveraging cookie stitchers. Using this process, a user's website ID may be identified from a secondary source (i.e., one contained in a user record), thereby allowing a network server to provide an enhanced level of security by comparing the locally-generated website ID from received user authenticating information to the website ID contained in the user record. Without the improvements suggested herein, a user could merely provide user authenticating information from any computing device to access secure content, and therefore any user could access the secure content simply by providing the proper user authenticating information.

Additionally, some of the cookie-stitching embodiments described herein allow for user information to be identified from within a user record. In doing so, the cookie-stitching embodiments address issues related to processing and resource usage by the network server hosting the website. For example, a network server may advantageously utilize less processing resources and time by offloading the user identification tasks to other back-end components. Therefore, the cookie-stitching embodiments also help address issues related to controlling processing resources and regulating power usage.

Still further, the non-cookie-stitching embodiments described herein include uniquely identifying computing devices, and "tagging" these computing devices as part of different security protocols by storing data tokens on computing devices when accessing the secure content. Upon being tagged, these computing devices may subsequently pass security verification steps that the devices previously failed. In doing so, the non-cookie-stitching embodiments facilitate enhanced security, and do so by increasing the speed in which computing devices may pass these security verifications in the future. Thus, a network server may also advantageously utilize less processing resources and time for non-cookie-stitching embodiments while providing increased security measured on via uniquely identifying computing devices and controlling access to secure content on a per-device basis. Therefore, the non-cookie-stitching embodiments also help address issues related to controlling processing resources and regulating power usage.

Additional Considerations

For ease of explanation, the disclosure may generally refer to specific components as performing the various calculations and other functions implemented by the embodiments described herein. However, it will be understood that any suitable function described herein is not limited to the particular component for which its functionality is described.

As used herein, the term "store," or "retailer" may include, for example, a single outlet or a plurality of outlets affiliated with one or more entities that are licensed or otherwise authorized to sell merchandise, to dispense prescribed pharmaceutical products such as drugs, medicaments, durable medical equipment, etc. The one or more entities may be located, for example, in geographic locations separate from one another, in different areas of the same city, or in different states, countries, etc. The retail stores may include, for example, one or more of a conventional retail store, space within a location operated by another commercial or not-for-profit entity (e.g., within a discount store, hospital, school, nursing home, etc.), an outlet in proximity with a warehouse or distribution center, a call-in pharmacy, a long-term care pharmacy, a workplace/on-site pharmacy, a specialty pharmacy, etc. The pharmacy may be commercial or not-for-profit, and may provide or vend other products in addition to the prescribed pharmaceutical products.

Furthermore, the embodiments described herein may be applicable to any suitable system, website, or network in which access to secure content is desired.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A computer-implemented method in a network server, comprising:
    actively monitoring, by the network server hosting a website, web traffic between the network server and a computing device of a user currently navigating the website, wherein the web traffic is generated from the computing device visiting the website;
    receiving, by the network server, user authenticating information that is provided via the computing device attempting to access a secure content that is hosted by the network server;
    identifying a first attribute associated with the user authenticating information, wherein the first attribute is a first website identification that is used by the network server to uniquely identify the user and the website during a browsing session;
    receiving, by the network server from an external computing device, user data for the user based upon an identified association of the computing device with the user, wherein the external computing device is external from the network server and distinct from the computing device;
    identifying a second attribute included in the user data, wherein the second attribute is a second website identification that uniquely identifies the user and the website;
    determining whether the first website identification matches the second website identification;
    when the first website identification and the second website identification match one another, granting, by the network server, the computing device access to the secure content; and
    when the first website identification and the second website identification do not match one another, triggering, by the network server, execution of a two-factor authentication (2FA).

2. The computer-implemented method of claim 1, wherein receiving the user data comprises:
    receiving, by the network server from a cookie-stitching server, the user data.

3. The computer-implemented method of claim 2, wherein the cookie-stitching server identifies the user data by determining which one of several sets of user data is associated with the computing device.

4. The computer-implemented method of claim 3, wherein the cookie-stitching server identifies the user data using one or more of (i) cookie data, (ii) unique device identifiers, and (iii) browser information.

5. The computer-implemented method of claim 1, wherein the secure content includes one or more of payment information, prescription information, and health-related information.

6. A computer-readable non-transitory storage medium comprising instructions that, when executed, cause one or more processors to:
    actively monitor web traffic between a network server hosting a website and a computing device of a user currently navigating the website, wherein the web traffic is generated from the computing device visiting the website;
    receive, by the one or more processors, user authenticating information that is provided via the computing device attempting to access a secure content that is hosted by the network server;
    identify, by the one or more processors, a first attribute associated with the user authenticating information, wherein the first attribute is a first website identification that is used by the network server to uniquely identify the user and the website during a browsing session;
    receive, by the one or more processors from an external computing device, user data for the user based upon an identified association of the computing device with the user, wherein the external computing device is external from the network server and distinct from the computing device;
    identify, by the one or more processors, a second attribute included in the user data, wherein the second attribute is a second website identification that uniquely identifies the user and the website;
    determine, by the one or more processors, whether the first website identification matches the second website identification;
    when the first website identification and the second website identification match one another, grant, by the one or more processors, the computing device access to the secure content; and
    when the first website identification and the second website identification do not match one another, trigger, by the one or more processors, execution of a two-factor authentication (2FA), and grant the computing device access to the secure content upon satisfaction of one or more conditions associated with the 2FA.

7. The computer-readable non-transitory storage medium of claim 6, wherein the external computing device is a cookie-stitching server.

8. The computer-readable non-transitory storage medium of claim 7, wherein a processor of the cookie-stitching server identifies the user data by determining which one of several sets of user data is associated with the computing device.

9. The computer-readable non-transitory storage medium of claim 7, wherein a processor of the cookie-stitching server identifies the user data including one or more of (i) data from a cookie, (ii) unique device identifiers, and (iii) browser information.

10. The computer-readable non-transitory storage medium of claim 6, wherein the secure content includes one or more of payment information, prescription information, and health-related information.

11. A system for providing access to a secure content, comprising:
- a memory storing a set of instructions; and
- a processor interfaced with the memory and configured to execute the set of instructions to cause the processor to:
- actively monitor web traffic between a network server hosting a website and a computing device of a user currently navigating the website, wherein the web traffic is generated from the computing device visiting the website;
- receive user authenticating information that is provided via the computing device attempting to access the secure content that is hosted by the network server;
- identify a first attribute associated with the user authenticating information, wherein the first attribute is a first website identification that is used by the network server to uniquely identify the user and the website during a browsing session;
- receive, from an external computing device, user data for the user based upon an identified association of the computing device with the user, wherein the external computing device is external from the network server and distinct from the computing device;
- identify a second attribute included in the user data, wherein the second attribute is a second website identification that uniquely identifies the user and the website;
- determine whether the first website identification matches the second website identification;
- when the first website identification and the second website identification match one another, grant the computing device access to the secure content; and
- when the first website identification and the second website identification do not match one another, trigger execution of a two-factor authentication (2FA).

12. The system of claim 11, wherein the external computing device is a cookie-stitching server.

13. The system of claim 11, wherein the secure content includes one or more of payment information, prescription information, and health-related information.

* * * * *